(12) United States Patent
Song et al.

(10) Patent No.: US 11,374,437 B2
(45) Date of Patent: Jun. 28, 2022

(54) WIRELESS POWER SUPPLY DEVICE AND METHOD THEREFOR

(71) Applicant: Samsung Electronics Co., Ltd., Gyeonggi-do (KR)

(72) Inventors: Mi-Jeong Song, Gyeonggi-do (KR); Bum-Hee Bae, Gyeonggi-do (KR); Youn-Ho Kim, Seoul (KR); Hyung-Geun Kim, Gyeonggi-do (KR); Keon-Young Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 16/637,074

(22) PCT Filed: Aug. 8, 2018

(86) PCT No.: PCT/KR2018/009050
§ 371 (c)(1),
(2) Date: Feb. 6, 2020

(87) PCT Pub. No.: WO2019/031855
PCT Pub. Date: Feb. 14, 2019

(65) Prior Publication Data
US 2020/0244109 A1      Jul. 30, 2020

(30) Foreign Application Priority Data

Aug. 10, 2017   (KR) .......................... 10-2017-0101919

(51) Int. Cl.
*H04B 5/00*       (2006.01)
*H02J 50/50*      (2016.01)
(Continued)

(52) U.S. Cl.
CPC ............... *H02J 50/50* (2016.02); *B60J 7/043* (2013.01); *B60R 16/03* (2013.01); *H01F 38/14* (2013.01);
(Continued)

(58) Field of Classification Search
CPC  H04B 1/082; H04B 7/15535; H04B 7/15507; H02J 50/50; H02J 50/502;
(Continued)

(56) References Cited

U.S. PATENT DOCUMENTS 9,013,189 B2 * 4/2015 Shea ........................ G01R 1/20
                                                       324/538
9,130,397 B2   9/2015 Leabman et al.
(Continued)

FOREIGN PATENT DOCUMENTS

JP      2014-182699 A     9/2014
KR   10-2014-0021696 A    2/2014
(Continued)

*Primary Examiner* — Nhan T Le
(74) *Attorney, Agent, or Firm* — Cha & Reiter, LLC

(57) ABSTRACT

A repeater may comprise: a first member; and at least one pattern formed on the first member and configured to provide at least one of an electric field and a magnetic field, which is incident from a wireless power transmitter onto a first surface of the first member, through a second surface of the first member, opposite to the first surface.

14 Claims, 19 Drawing Sheets

(51) Int. Cl.
  *H02J 50/10* (2016.01)
  *H02J 50/23* (2016.01)
  *B60J 7/043* (2006.01)
  *B60R 16/03* (2006.01)
  *H01F 38/14* (2006.01)
  *H01Q 1/32* (2006.01)
  *H04B 7/155* (2006.01)

(52) U.S. Cl.
  CPC ............... *H01Q 1/32* (2013.01); *H02J 50/10* (2016.02); *H02J 50/23* (2016.02); *H04B 7/15535* (2013.01)

(58) Field of Classification Search
  CPC .. H02J 5/005; H02J 50/10; H02J 50/20; H02J 50/23; H02J 50/40; B60R 16/03; H01Q 1/32; B60J 1/00; B60J 1/02; B60J 7/043; H01F 38/14
  See application file for complete search history.

(56) References Cited

U.S. PATENT DOCUMENTS

| | | | |
|---|---|---|---|
| 2012/0214406 A1* | 8/2012 | Risheq | H04B 7/2606 455/7 |
| 2016/0126614 A1 | 5/2016 | Lim et al. | |
| 2016/0248270 A1 | 8/2016 | Zeine et al. | |
| 2017/0047790 A1 | 2/2017 | Olsson et al. | |
| 2017/0237149 A1* | 8/2017 | Lee | G06K 7/00 361/679.21 |
| 2018/0364835 A1* | 12/2018 | Kwon | B32B 27/08 |

FOREIGN PATENT DOCUMENTS

| | | |
|---|---|---|
| KR | 10-2015-0093526 A | 8/2015 |
| KR | 10-2015-0130542 A | 11/2015 |
| KR | 10-2016-0050467 A | 5/2016 |

\* cited by examiner

WIRELESS POWER SUPPLY DEVICE AND METHOD THEREFOR

CROSS-REFERENCE TO RELATED APPLICATION(S)

This application is a National Phase Entry of PCT International Application No. PCT/KR2018/009050, which was filed on Aug. 8, 2018 and claims priority to Korean Patent Application No. 10-2017-0101919, which was filed on Aug. 10, 2017, the contents of which are incorporated herein by reference.

TECHNICAL FIELD

Various embodiments of the present disclosure relate to a wireless power supply device and a method for the same.

BACKGROUND ART

Digital communication devices are essential elements for modern society. Customers desire to receive various high-quality services all the time, everywhere. Moreover, recently the Internet of Things (IoT) has bundled various sensors, home appliances, and communication devices up into a single network. A diversity of sensors requires a wireless power transmission system for seamless operations.

To transmit wireless power, various sources for supplying wireless power have been used. For example, electronic devices may be used as a source for transmitting wireless power. A set-top box (STB), for example, may provide wireless power to a television (TV) connected thereto.

Recently, techniques for supplying wireless power in vehicles have emerged. For instance, a radio frequency (RF) transmitter connected to a cigar jack in a vehicle may transmit and receive energy formed by a constructive interference pattern to an RF receiver connected to an electronic device in the vehicle, thus charging a battery of the electronic device in the vehicle. Power may also be wirelessly supplied to a seat in the vehicle by using magnetic resonance.

DETAILED DESCRIPTION OF THE INVENTION

Technical Problem

Devices associated with a vehicle, located outside the vehicle, may have trouble in receiving wireless power.

For example, a smart key outside a vehicle, a communication device connecting an autonomous driving vehicle with a driver outside the vehicle, a sensor and an actuator attached to the inside or outside of the vehicle, an emergency light attached to the outside of the vehicle, an emergency light indicating device to be on a road in the event of an accident, a drone associated with a vehicle, a black box that takes a picture or records voice outside the vehicle in the event of an accident, etc., may have limitations in receiving wireless power.

Wireless power provided in the vehicle merely charges the battery of a receiving device for the wireless power, but is not directly used to drive the receiving device. Thus, the wireless power of the vehicle is limited in use thereof.

The wireless power provided in the vehicle is limited in fast charging and suppliable power due to a medium limited to RF energy and the nature of RF suitable only for low-power transmission and reception.

The wireless power provided in the vehicle is limitedly provided to a particular device, and thus may not be provided to various types of electronic devices used inside and outside the vehicle (e.g., a smart key, a black box, a smart phone, smart glasses, a speaker, a smart watch, a tablet, and a laptop personal computer (PC)).

The wireless power provided in the vehicle is directly provided through a power source (e.g., a cigar jack) of the vehicle, such that the wireless power may not be supplied when the vehicle is off from operation.

Various embodiments of the present disclosure provide a wireless power supply device and a method thereof, in which wireless power is supplied to not only an electronic device located inside a vehicle, but also an electronic device located outside the vehicle.

Various embodiments of the present disclosure also provide a wireless power supply device and a method thereof, in which various energies are used as a medium for wireless power, wireless power is used for various purposes, and wireless power is supplied to various electronic devices.

Moreover, various embodiments of the present disclosure provide a wireless power supply device and a method thereof, in which wireless power is supplied even when the vehicle is off from operation.

Technical Solution

A repeater according to various embodiments of the present disclosure includes a first member and at least one pattern formed on the first member and configured to provide at least one of an electric field or a magnetic field, which is incident to a first surface of the first member from a wireless power transmission device, through a second surface of the first member, which opposes the first surface.

A window for a vehicle according to various embodiments of the present disclosure includes a first transparent member and a second member located on at least one surface of the first transparent member or inside the first transparent member, in which the second member includes at least one pattern formed in the second member and configured to provide at least one of an electric field or a magnetic field, which is incident to a first surface of the second member from a wireless power transmission device, through a second surface of the second member, which opposes the first surface.

A body for a vehicle according to various embodiments of the present disclosure includes a first member as a part of the body and a second member located on at least one surface of the first member or inside the first member, in which the second member includes at least one pattern formed in the second member and configured to provide at least one of an electric field or a magnetic field, which is incident to a first surface of the second member from a wireless power transmission device, through a second surface of the second member, which opposes the first surface.

Advantageous Effects

According to various embodiments of the present disclosure, a wireless power supply device may supply wireless power to not only an electronic device located inside a vehicle, but also an electronic device located outside the vehicle.

According to various embodiments of the present disclosure, a wireless power supply device may use wireless power not only to charge a battery of an electronic device, but also to directly drive the electronic device.

According to various embodiments of the present disclosure, a wireless power supply device may enable fast and high power.

According to various embodiments of the present disclosure, a wireless power supply device may improve general use by supplying wireless power to various electronic devices.

According to various embodiments of the present disclosure, a wireless power supply device may not be influenced by whether the vehicle is off or on.

MODE FOR CARRYING OUT THE INVENTION

Figure 1A:
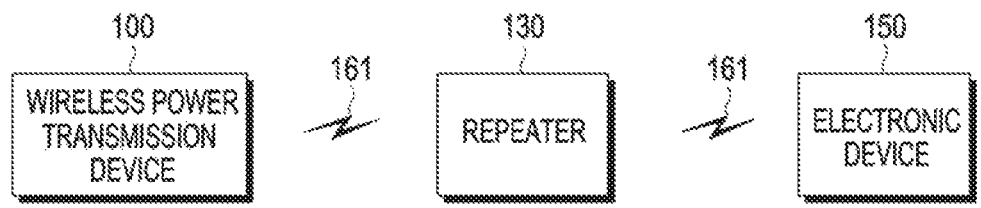
FIG. 1A is a block diagram of a wireless power transmission device, a repeater, and an electronic device, according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

A wireless power transmission device or an electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device.

In some embodiments, examples of the wireless power transmission device or electronic device may include at least one of a television, a set-top box (STB) wiredly or wirelessly interworking with the TV, a digital video disk (DVD) player, an audio player, a refrigerator, an air conditioner, a cleaner, an oven, a microwave oven, a washer, a dryer, an air cleaner, a set-top box, a home automation control panel, a security control panel, a media box, a gaming console, an electronic dictionary, an electronic key, a camcorder, or an electronic picture frame.

In other embodiments, the wireless power transmission device or the electronic device may include at least one of various medical equipment (e.g., various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), or Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the wireless power transmission device or the electronic device may include a part of some furniture, a building/structure or a part of a vehicle, an electronic board, an electronic signature receiving device, a projector, and various measuring instruments (e.g., a water, electricity, gas, electric wave measuring device, etc.).

According to various embodiments, the wireless power transmission apparatus or electronic device may be flexible or may be a combination of two or more of the above-described various devices. The wireless power transmission apparatus or electronic device according to an embodiment of the disclosure is not limited to the above-listed embodiments. Herein, the term "user" used in various embodiments of the present disclosure may refer to a person who uses the electronic device or a device (e.g., an artificial intelligence (AI) electronic device) using the wireless power transmission apparatus or electronic device.

FIG. 1A is a block diagram of a wireless power transmission device, a repeater, and an electronic device, according to various embodiments of the present disclosure.

Referring to FIG. 1A, a wireless power supply device (not shown) may include a wireless power transmission device 100 and a repeater 130.

According to various embodiments of the present disclosure, the wireless power transmission device 100 may wirelessly transmit power 161 to an electronic device 150.

Wireless power transmission may include a magnetic inductive scheme, a magnetic resonant scheme, and an electromagnetic scheme. The magnetic inductive scheme or the magnetic resonant scheme is useful for charging an electronic device located in a short range from the wireless power transmission device. The electromagnetic scheme is favorable to longer-range power transmission covering several meters when compared to the magnetic inductive scheme or the magnetic resonant scheme. The electromagnetic scheme may most efficiently deliver power by grasping the exact location of remote power receivers.

The wireless power transmission device 100 may transmit the power 161 to the electronic device 150 according to various charging schemes.

For example, the wireless power transmission device 100 may transmit the power 161 according to an inductive scheme. When using the inductive scheme, the wireless power transmission device 100 may include a power source, a direct current (DC)-alternate current (AC) inversion circuit, an amplification circuit, an impedance-matching circuit, at least one capacitor, at least one coil, a communication modulation/demodulation circuit, etc. The at least one capacitor may constitute a resonance circuit together with at least one coil.

The wireless power transmission device 100 may be implemented in a manner defined in wireless power consortium (WPC) standards (or Qi standards). For example, the wireless power transmission device 100 may transmit the power 161 according to a resonant scheme. When using the resonant scheme, the wireless power transmission device 100 may include a power source, a DC-AC inversion circuit, an amplification circuit, an impedance-matching circuit, at least one capacitor, at least one coil, an out-band communication circuit (e.g., a Bluetooth low energy (BLE) communication circuit), etc. The at least one capacitor and the at least one coil may constitute a resonance circuit.

The wireless power transmission device 100 may be implemented in a manner defined in Alliance for Wireless Power (A4WP) standards (or Air Fuel Alliance (AFA) standards). The wireless power transmission device 100 may include a coil capable of producing an induced magnetic field according to the resonant scheme or the inductive scheme when electric current flows. A process in which the wireless power transmission device 100 produces the induced magnetic field may be expressed as wireless transmission of the power 161 by the wireless power transmission device 100. The electronic device 150 may include a coil in which an induced electromotive force is generated by a formed ambient magnetic field having a magnitude changing over time. A process in which the electronic device 150 generates the induced electromotive force may be expressed as wireless reception of the power 161 by the electronic device 150.

For example, the wireless power transmission device 100 may transmit the power 161 according to the electromagnetic scheme. When using the electromagnetic scheme, the wireless power transmission device 100 may include a power source, a DC-AC inversion circuit, an amplification circuit, a distribution circuit, a phase shifter, an antenna array for power transmission including a plurality of patch antennas, an out-band communication circuit (e.g., a BLE communication circuit), etc. Each of the plurality of patch antennas may form an RF wave (e.g., an electromagnetic wave). The electronic device 150 may include a patch antenna capable of outputting current by using a formed ambient RF wave. A process in which the wireless power transmission device 100 forms the RF wave may be expressed as wireless transmission of the power 161 by the wireless power transmission device 100. A process in which the electronic device 150 outputs the current from the patch antenna by using the RF wave may be expressed as wireless reception of the power 161 by the electronic device 150.

According to various embodiments of the present disclosure, the wireless power transmission device 100 may wirelessly transmit power to the electronic device 150 through the repeater 130. Thus, the electronic device 150 may wirelessly receive power from the wireless power transmission device 100 through the repeater 130.

The repeater 130 may relay the power 161. The repeater 130 may pass the power 161 transmitted from the wireless power transmission device 100 therethrough and transmit the power 161 to the electronic device 150. By controlling at least one of an electric field or a magnetic field, the repeater 130 may relay the power 161 between the wireless power transmission device 100 and the electronic device 150. The repeater 130 will be described later.

According to various embodiments of the present disclosure, the wireless power transmission device 100 may communicate with electronic device 150. For example, the wireless power transmission device 100 may perform communication with the electronic device 150 according to an in-band scheme. The wireless power transmission device 100 or the electronic device 150 may change a load (or impedance) of transmission data according to, for example, an on/off keying modulation scheme. The wireless power transmission device 100 or the electronic device 150 may determine data transmitted from a counterpart device by measuring a load change (or impedance change) based on a magnitude change of current, voltage, or power of a coil. For example, the wireless power transmission device 100 may perform communication with the electronic device 150 according to an out-band scheme. The wireless power transmission device 100 or the electronic device 150 may transmit and receive data by using a communication circuit (e.g., a BLE communication module) provided separately from the coil or the patch antenna.

Figure 1B:
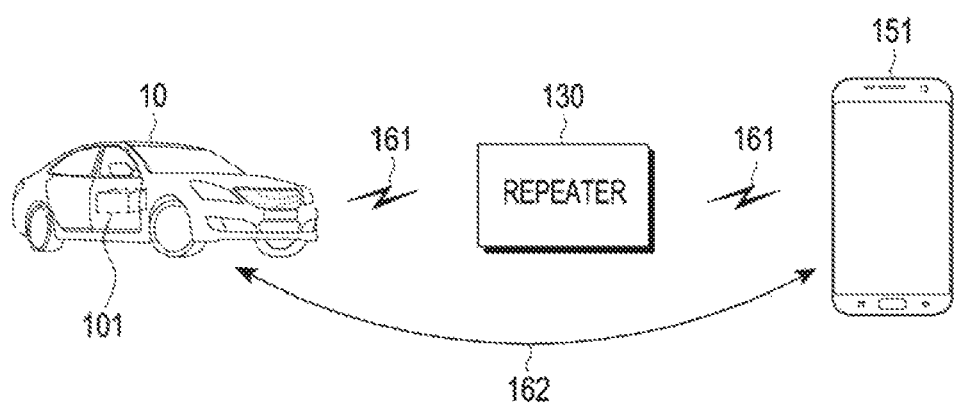
FIG. 1B is a block diagram of a vehicle, a repeater, and an electronic device, according to various embodiments of the present disclosure.

FIG. 1B is a block diagram of a vehicle, a repeater, and an electronic device, according to various embodiments of the present disclosure.

An in-vehicle wireless energy supply (IVWES) 101 included in the vehicle 10 according to various embodiments of the present disclosure may wirelessly transmit the power 161 to a smartphone 151. The IVWES 101 may be an example of the wireless power transmission device 100, and the smartphone 151 may be an example of the electronic device 150 that wirelessly receives power.

The IVWES 101 may include a power transmission circuit using at least one of the above-described wireless charging schemes. The IVWES 101 may transmit a communication signal 162 to the smartphone 151. For example, the communication signal 162 may include at least one of data for controlling wireless charging, IVWES control data used for controlling an operation of the IVWES 101 by the smartphone 151, or smartphone control data used for controlling an operation of the smartphone 151 by the IVWES 101.

The data for controlling wireless charging, the IVWES control data, and the smartphone control data may be transmitted and received using the same communication scheme or different communication schemes. For example, the IVWES 101 may transmit and receive the data for controlling wireless charging by using a BLE module, and transmit and receive the smartphone control data from and to the smartphone 151 by using an infrared (IR) module, without any limitation in a communication scheme.

In various embodiments of the present disclosure, the data for controlling wireless charging, the IVWES control data, and the smartphone control data may be transmitted and received by one communication module. For example, the IVWES 101 may transmit the data for controlling wireless charging and the smartphone control data through a BLE module.

Figure 2:
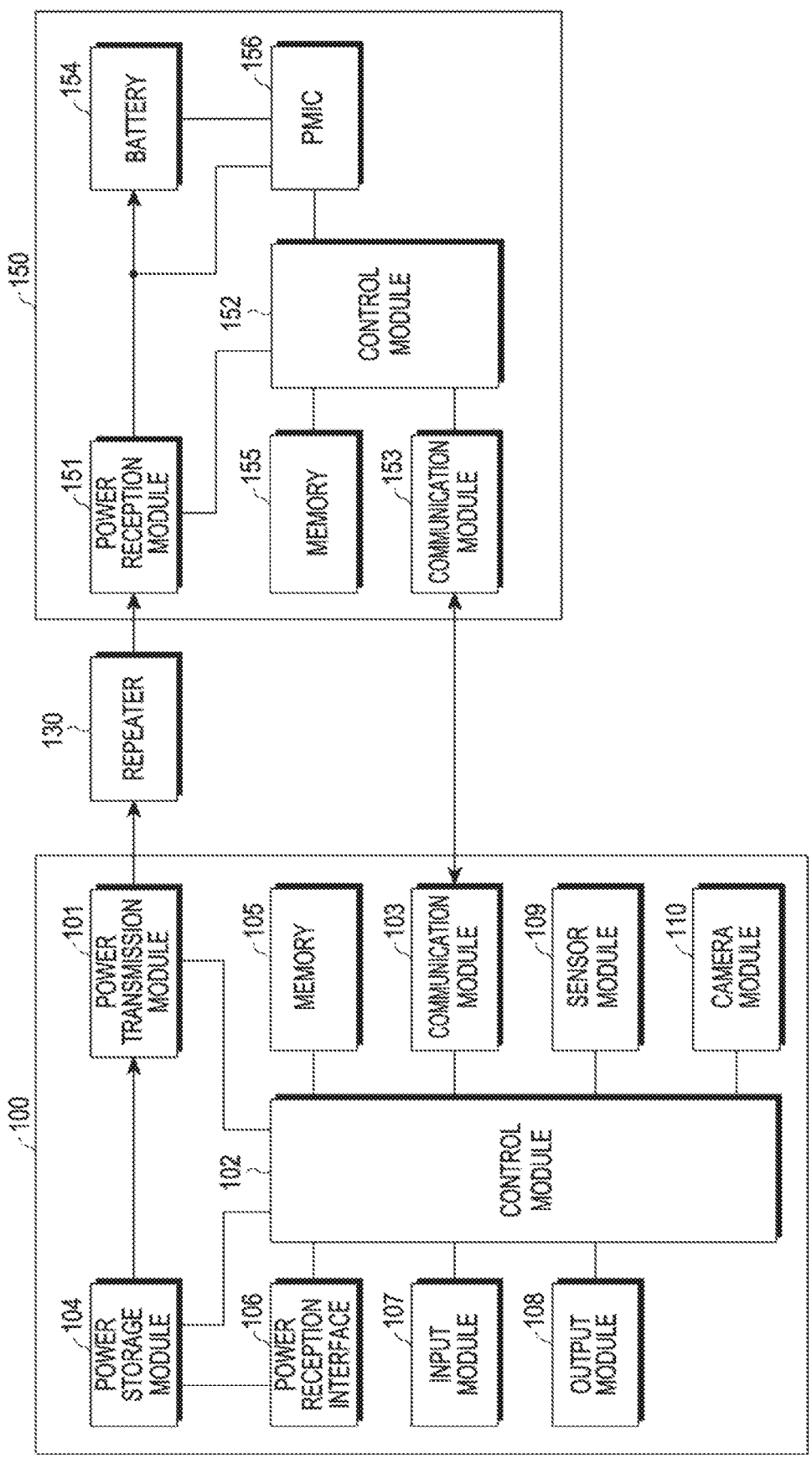
FIG. 2 is a block diagram of a wireless power transmission device, a repeater, and an electronic device, according to various embodiments of the present disclosure.

FIG. 2 is a block diagram of a wireless power transmission device, a repeater, and an electronic device, according to various embodiments of the present disclosure.

The wireless power transmission device 100 according to various embodiments of the present disclosure may include a power transmission module 101, a control module 102, a communication module 103, a power storage module 104, a memory 105, a power reception interface 106, an input module 107, an output module 108, a sensor module 109, and a camera module 110.

According to various embodiments of the present disclosure, the electronic device 150 may include a power reception module 151, a control module 152, a communication module 153, a battery 154, a memory 155, and a power management integrated circuit (PMIC) 156.

The wireless power transmission device 100 may directly transmit and receive wireless power to and from the electronic device 150, but hereinbelow, the wireless power transmission device 100 is assumed to wirelessly transmit power through the repeater 130 and to wirelessly receive power transmitted from the wireless power transmission device 100 through the repeater 130.

The power transmission module 101 and the power reception module 151 according to various embodiments of the present disclosure may wirelessly transmit and receive power according to at least one of the inductive scheme, the resonant scheme, or the electromagnetic scheme.

The power transmission module 101 may convert power supplied from the power storage module 106 into a wirelessly transmittable form. The power transmission module 101 may convert the power supplied from the power storage module 106 into a magnetic field caused by magnetic resonance, a magnetic field caused by magnetic induction, RF (e.g., electromagnetic waves), infrared rays, ultrasonic waves, terahertz waves or T rays, visible rays, etc.

The power transmission module 101 may transmit power by using energy of any one of the magnetic field caused by magnetic resonance, the magnetic field caused by magnetic induction, the RF, the infrared rays, the ultrasonic waves, the terahertz waves or T rays, and the visible rays alone or in a hybrid form including energy of two or more of them.

The power transmission module 101 may be included in plural in the wireless power transmission device 100. The power transmission module 101 may be attached to the outside of the wireless power transmission device 100, or may be included in the wireless power transmission device 100.

The power reception module 151 may convert power transmitted from the power transmission module 101 into a form available by the electronic device 150. The power reception module 151 may convert electromagnetic waves caused by magnetic resonance, electromagnetic waves caused by magnetic induction, RF, infrared rays, ultrasonic waves, terahertz waves (T-rays), visible rays, etc., received from the power transmission module 101, into an energy form that is storable in the battery 154.

The power reception module 151 may receive energy of any one of the electromagnetic waves caused by magnetic resonance, the electromagnetic waves caused by magnetic induction, the RF, the infrared rays, the ultrasonic waves, the terahertz waves (T-rays), the visible rays alone, or energy of two or more of them combined in a hybrid form. Thereafter, the power reception module 151 may perform power processing of rectifying the received power in AC waveforms into DC waveforms, converting a voltage, or regulating power.

The power reception module 151 may be included in plural in the electronic device 150. The power reception module 151 may be attached to the outside of the electronic device 150, or may be included in the electronic device 150.

The power reception module 151 may deliver the received wireless power to the battery 154 for charging. The power reception module 151 may deliver the received wireless power to the PMIC 156 for driving of the electronic device 150. The PMIC 156 may process wireless power suitably for hardware, and then deliver the processed wireless power to each component of the electronic device 150.

Detailed structures of the power transmission module 101 and the power reception module 151 will be described in more detail with reference to FIGS. 3A and 3B.

The control module 102 may control a magnitude of power transmitted by the power transmission module 101. For example, the control module 102 may control the magnitude of the power transmitted by the power transmission module 101 by controlling a magnitude of power output from the power storage module 104 or controlling an amplification gain of a power amplifier included in the power transmission module 101. The control module 102 may adjust the magnitude of the power output from the power storage module 104 by controlling a duty cycle or a frequency of the power output from the power storage module 104. The control module 102 may control the magnitude of the power applied to the power transmission module 101, by controlling a magnitude of a bias voltage of the power amplifier.

The control module 102 may determine a wireless power transmission order or a priority for transmission power quantity or transmission electric energy, based on a position of the electronic device 150, a distance from the wireless power transmission device 100 to the electronic device 150, the amount of power or energy required by the electronic device 150, and a transmission purpose. For example, when the wireless power transmission device 100 transmits wireless power to a plurality of electronic devices 150-1, 150-2, 150-3, . . . , 150-n, the control module 102 may determine a priority to transmit wireless power first to the electronic device used with most frequency.

When the power transmission module 101 is provided in plural, the control module 102 may control the power transmission module 101 to transmit wireless power using a combination of the magnetic inductive scheme, the magnetic resonant scheme, and the electromagnetic scheme. For example, the control module 102 may control a first power transmission module to transmit wireless power by using the magnetic inductive scheme, and a second power transmission module to transmit wireless power by using the electromagnetic scheme.

The control module 102 may control the power transmission module 101 to operate in a fast charging mode. In the fast charging mode, the power transmission module 101 may transmit a high density of power to the electronic device 150 within a short time. For example, the control module 102 may activate all of the plurality of power transmission modules 101 which may then intensively deliver energy stored in the power storage module 104 to one electronic device 150.

In the fast charging mode, the control module 102 may control the power transmission module 101 to deliver energy in another form. For example, usually, i.e., in a normal charging mode other than the fast charging mode, the control module 102 may control the power transmission module 101 to transmit wireless power through a magnetic field caused by magnetic resonance. In the fast charging mode, the control module 102 may control the power transmission module 101 to transmit wireless power through a magnetic field caused by magnetic induction or RF.

The control module 102 may monitor power quantity stored in the power transmission module 104. When the stored power quantity is less than or equal to a threshold value, the control module 102 may block wireless power transmission or output an alarm sound to a user through a speaker using the output module 108, or output a notification using an alarm sound, vibration, etc. When the stored power quantity is greater than the threshold value, the control module 102 may block power reception from a power supply device 400.

The control module 152 may control overall operations of the electronic device 150.

The control module 102 or the control module 152 may be implemented with various circuits capable of performing computation such as a general-purpose processor like a CPU, a mini computer, a microprocessor, a micro controlling unit (MCU), a field programmable gate array (FPGA), etc., and is not limited in its type.

The communication module 103 may be provided for connection with the electronic device 150 directly or through a network, and may use a wired or wireless scheme, and wiredly or wirelessly transmit data from the control module 102, the memory 105, the sensor module 110, and the camera module 111, or wiredly or wirelessly receive data from an external communication line or the air and deliver the received data to the control module 102 or store the received data in the memory 105.

The communication module 153 may be provided for connection with the wireless power transmission device 100 directly or through a network, and may use a wired or wireless scheme, and wiredly or wirelessly transmit data from the control module 152 and the memory 155, and the camera module 155, or wiredly or wirelessly receive data from an external communication line or the air and deliver the received data to the control module 152 or store the received data in the memory 155.

The communication module 103 or 153 may include a mobile communication module, a WLAN module, a short-range communication module, etc. The communication module 103 or 153 may include a communication card, a communication interface, a communication modem, etc., and may include, for example, an integrated services digital network (ISDN) card, a modem, a local area network (LAN) card, an IR port, a Bluetooth port, a Zigbee port, a wireless port, etc.

The communication modules 103 and 153 may support wired and wireless communications such as short-range wired/wireless communications (e.g., Wireless Fidelity (WiFi), Bluetooth (BT), radio frequency identification (RFID), near field communication (NFC), network communication (e.g., Internet, an LAN, a wireless area network (WAN), a telecommunication network, a cellular network, a satellite network, a universal serial bus (USB), recommended standard 232 (RS-232), a plain old telephone service (POTS), etc.).

The power storage module 104 may store power to be wirelessly transmitted to the electronic device 150. The power storage module 104 may be supplied with power from the power supply device 400 and store the supplied power. More specifically, the power storage module 104 may be supplied with power from the power supply device 400 through the power reception interface 106. The power supply device 400 may be located outside the wireless power transmission device 100, and may receive power from outside the wireless power transmission device 100. The power storage module 104 may store power received from outside the wireless power transmission device 100 and deliver the stored power to the power transmission module 101 to wirelessly transmit power to the electronic device 150.

The power storage module 104 may store energy in various forms. The power storage module 104 may be at least one of a secondary battery, a thermal battery, or a fuel battery, without being limited in its form. For example, the power storage module 104 may be a lithium ion battery.

The power storage module 104 may store energy in various manners. The power storage module 104 may store energy using an electricity charging scheme or fuel charging scheme. The power storage module 104 may store energy using a heating or cooling scheme. For example, when being a secondary battery, the power storage module 104 may store energy using the electricity charging scheme. When being a fuel battery, the power storage module 104 may store energy using the fuel charging scheme.

The power storage module 104 may receive energy from the power supply device 400 wiredly or wirelessly. More specifically, the power storage module 104 may receive energy from the power supply device 400 through the power reception interface 106.

The power storage module 104 may be detachable from or attachable to the vehicle 10 when the wireless power transmission device 100 is mounted on the vehicle 10.

The power storage module 104 may receive and store energy, regardless of whether the vehicle 10 is off or on at operation. For example, the power supply device 400, when being a solar cell module, may continuously accumulate solar energy as long as the vehicle 10 is exposed to the sun even when the vehicle 10 is off from operation.

The battery 154 may store power necessary for the electronic device 150. The battery 154 may wirelessly receive power from the wireless power transmission device 100 and store the received power. More specifically, the battery 154 may directly receive power from the power reception module 151 or may receive power processed by the PMIC 156 suitably for hardware.

The memory 105 may store an instruction and data for performing operations of the wireless power transmission device 100. The memory 155 may store an instruction and data for performing operations of the electronic device 150. The memory 105 or the memory 155 may be implemented in various forms such as read-only memory (ROM), random-access memory (RAM), flash memory, etc., without being limited in its form.

The power reception interface 106 may interconnect the power supply device 400 with the power storage module 104 to store power of the power supply device 400 in the power storage module 104. The power reception interface 106 may compensate for differences in electrical or mechanical characteristics between the power storage module 104 and the power supply device 400. The power reception interface 106 may include a hardware interface (e.g., a plug, a connector, or a card) interconnecting the wireless power transmission device 100 with the power supply device 400. For example, when the wireless power transmission device 100 is supplied with power at home, the power reception interface 106 may be an electric plug connecting the wireless power transmission device 100 to a socket.

The PMIC 156 may process the received and processed power suitably for hardware (e.g., a communication module) and deliver the processed power to each component of the electronic device 150.

The input module 107, which is a means for receiving a user input, may include a keypad, a microphone, etc.

The keypad may receive a key input from a user for control of the wireless power transmission device 100. The keypad may include a physical keypad formed in the wireless power transmission device 100 or a virtual keypad displayed on a display of the output module 108.

The microphone may receive voice or sound and generate an electric signal, under control of the control module 102.

The output module 108, which is a means for providing information to the user, and may include a display, a speaker, etc. The output module 108 may provide the user with a graphic user interface corresponding to various services (e.g., call, data transmission, broadcasting, photo/video-taking, etc.).

The display may output a still image and a moving image, under control of the control module 102. The display may include a panel such as a liquid crystal display (LCD), an active-matrix organic light-emitting diode (AM-OLED), or the like.

The speaker may output sound corresponding to various signals (e.g., a radio signal, a digital audio file, a digital video file, photo-taking, etc.) to outside the wireless power transmission device 100, under control of the control module 102. The speaker may output sound corresponding to a function performed by the wireless power transmission device 100. The speaker may be formed in singular or plural in at least one proper position of the wireless power transmission device 100.

The sensor module 109 measures physical quantity or senses an operation state of the wireless power transmission device 100 to convert the measured or sensed information into an electric signal. The sensor module 109 may, for example, include at least one of a gesture sensor, a gyro sensor, a pressure sensor, a magnetic sensor, an acceleration sensor, a grip sensor, a proximity sensor, a color sensor (e.g., RGB sensor), a biometric sensor, a temperature/humidity sensor, an illumination sensor, an ultraviolet (UV) sensor, or a gas sensor.

The camera module 110 may be, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

Figure 3A:
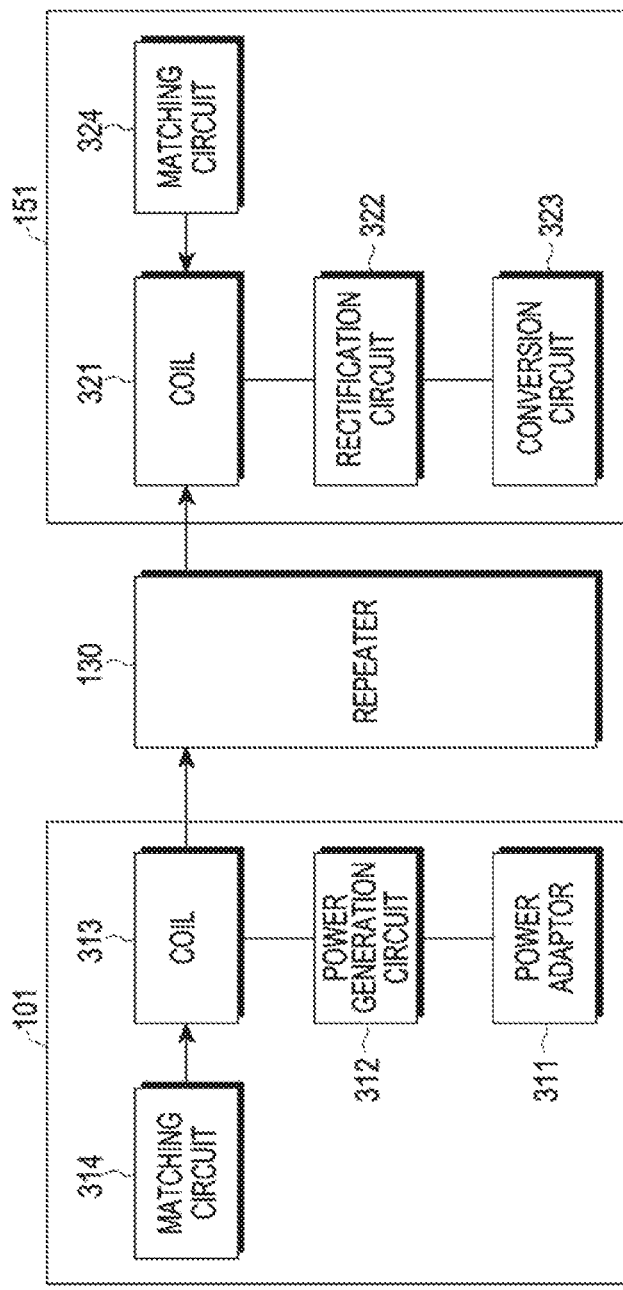
FIG. 3A is a block diagram of inductive-type or resonant-type power transmission module and power reception module, according to various embodiments of the present disclosure.

FIG. 3A is a block diagram of inductive-type or resonant-type power transmission module and power reception module, according to various embodiments of the present disclosure.

In various embodiments of the present disclosure, the power transmission module 101 may include a power adaptor 311, a power generation circuit 312, a coil 313, and a matching circuit 314. In various embodiments of the present disclosure, the power reception module 151 may include a coil 321, a rectification circuit 322, a conversion circuit 323, and a matching circuit 324.

The power adaptor 311 may receive power from the power storage module 104 and provide the received power to the power generation circuit 312.

The power generation circuit 312 may convert the received power into, for example, an AC waveform or amplify the received power, and then deliver the power to the coil 313. A frequency of an AC waveform may be set to, without being limited to, 100 to 205 kHz or 6.78 MHz, according to the standards.

Upon application of power to the coil 313, an induced magnetic field having a magnitude changing over time may be formed from the coil 313, such that power may be wirelessly transmitted. Although not shown, capacitors forming a resonant circuit together with the coil 313 may be further included in the power transmission module 101.

The matching circuit 314 may perform impedance-matching between the power transmission module 101 and the repeater 130 or between the power transmission module 101 and the power reception module 151, by changing at least one of a capacitance or a reactance of a circuit connected with the coil 313, under control of the control module 102.

In the coil 321 of the power reception module 151, an induced electromotive force may be generated by a formed ambient magnetic field having a magnitude changing over time, such that the power reception module 151 may wirelessly receive power through the repeater 130.

The rectification circuit 322 may rectify the received power of the AC waveform.

The conversion circuit 323 may adjust a voltage of the rectified power and deliver the voltage-adjusted power to the PMIC 156. The power reception module 151 may further include a regulator, or the conversion circuit 323 may be replaced with a regulator.

The matching circuit 324 may perform impedance-matching between the power reception module 151 and the repeater 130 or between the power reception module 151 and the power transmission module 101, by changing at least one of a capacitance or a reactance of a circuit connected with the coil 321, under control of the control module 152.

Figure 3B:
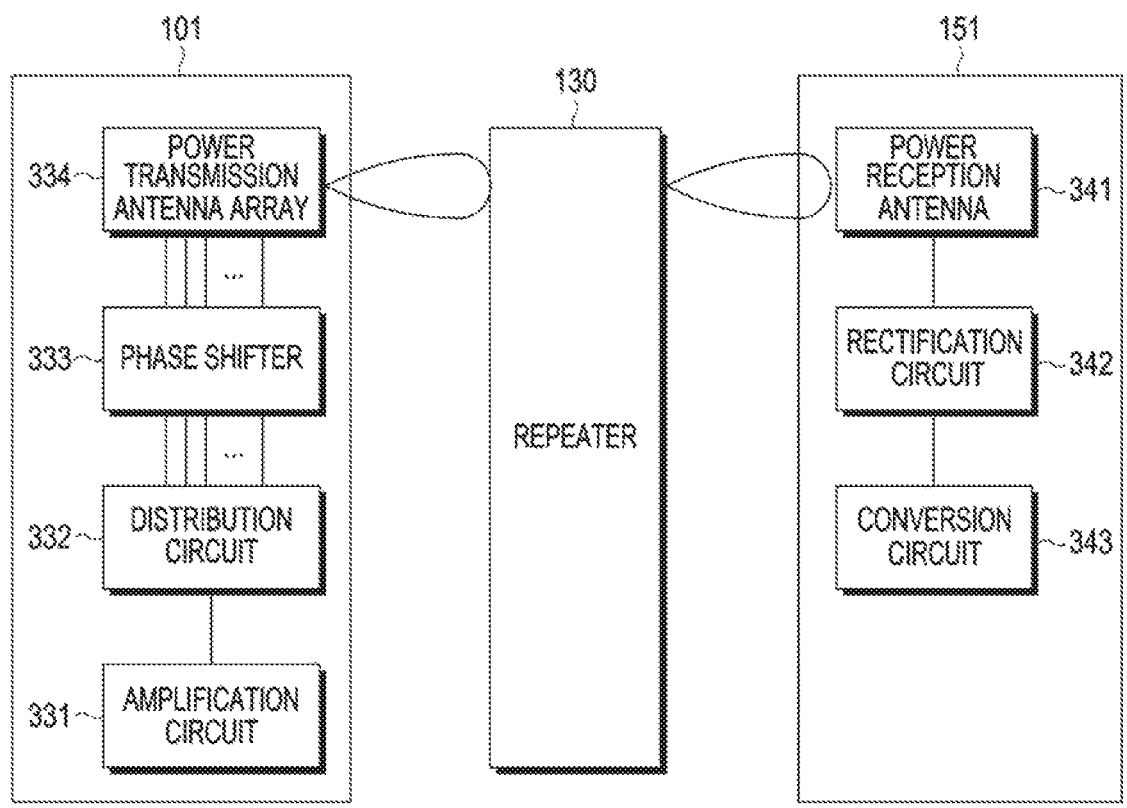
FIG. 3B is a block diagram of electromagnetic-type power transmission circuit and power reception circuit, according to various embodiments of the present disclosure.

FIG. 3B is a block diagram of electromagnetic-type power transmission circuit and power reception circuit, according to various embodiments of the present disclosure.

In various embodiments of the present disclosure, the power transmission module 101 may include an amplification circuit 331, a distribution circuit 332, a phase shifter 333, and a power transmission antenna array 334. In various embodiments of the present disclosure, the power reception module 151 may include a power reception antenna 341, a rectification circuit 342, and a conversion circuit 343.

The amplification circuit 331 may amplify the power provided from the power storage module 104 and provide the amplified power to the distribution circuit 332. The amplification circuit 331 may be implemented with various amplifiers such as a drive amplifier (DA), a high-power amplifier (HPA), a gain block amplifier (GBA), etc., or a combination thereof, without being limited in implementation examples thereof.

The distribution circuit 332 may distribute power output from the amplification circuit 331 in a plurality of paths. The distribution circuit 332 may not be limited as long as it is capable of distributing input power or signal in a plurality of paths. For example, the distribution circuit 332 may distribute power in as many paths as patch antennas included in the power transmission antenna array 334.

The phase shifter 333 may shift a phase (or delay) of each of a plurality of AC powers provided from the distribution circuit 332. The phase shifter 333 may be provided in plural, and for example, as many phase shifters 333 as the patch antennas included in the power transmission antenna array 334 may be provided. As the phase shifters 333, hardware components, such as the Hittite microwave corporation (HMC) 642 or HMC 1113, may be used. The degree of shift of each of the phase shifters 333 may be controlled by the control module 102. The control module 102 may determine a position of the electronic device 150, and may shift a phase of each of a plurality of AC powers such that RF waves are constructively interfere, i.e., beamformed in a position of the electronic device 150 (or a position of the power reception antenna 341 of the electronic device 150).

Each of the plurality of patch antennas included in the power transmission antenna array 334 may generate sub RF waves based on received power. The RF waves interfering with the sub RF waves may be converted into current, voltage, or power in the power reception antenna 341, and may be output to the repeater 130 or the power reception module 151.

The power reception antenna 341 may include a plurality of patch antennas, and may use formed ambient RF waves, i.e., electromagnetic waves to generate current, voltage, or power in an AC waveform, which may be referred to as received power.

The rectification circuit 342 may rectify the received power into a DC waveform.

The conversion circuit 343 may increase or reduce a voltage of the power in the DC waveform to a preset value and output the voltage-increased or reduced power to the PMIC 156.

At least one of the power transmission module 101 or the power reception module 151 according to various embodiments of the present disclosure may include hardware using the inductive scheme or the resonant scheme as shown in FIG. 3A and hardware using the electromagnetic scheme as shown in FIG. 3B. In this case, the control module 102 or the control module 152 may select a charging scheme according to various conditions to control hardware corresponding to the selected charging scheme to be driven. The control module 102 or the control module 152 may use the inductive scheme or the resonant scheme and the electromagnetic scheme and drive the included hardware to transmit and receive power.

Figure 4:
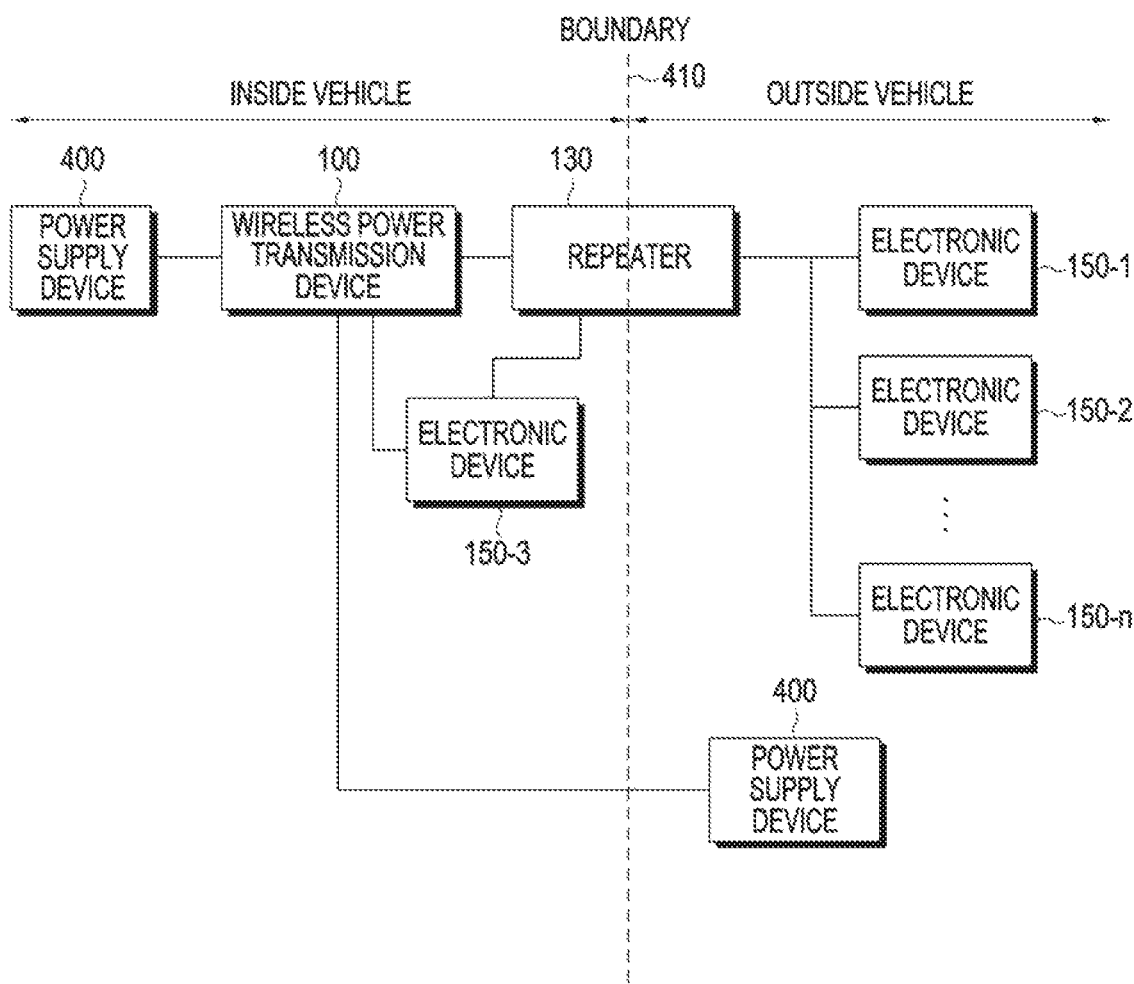
FIG. 4 is a block diagram of a wireless power supply device according to various embodiments of the present disclosure.

FIG. 4 is a block diagram of a wireless power supply device according to various embodiments of the present disclosure.

Referring to FIG. 4, a wireless power supply device may include the power supply device 400, the wireless power transmission device 100, the repeater 130, and the electronic device 150. Herein, the electronic device 150 may include multiple electronic devices 150-1, 150-2, 150-3, ..., and 150-n, which may be located outside the vehicle 10, and the electronic device 150-3 may be located inside the vehicle 10.

The power supply device 400 may supply energy to be used for wireless power transmission to the wireless power transmission device 100. The power supply device 400 may be implemented in various forms.

The power supply device 400 may be a vehicle battery used as an energy source for driving the vehicle 10, and in this case, the power supply device 400 may deliver a part of the charged energy to the power storage module 104 of the wireless power transmission device 100. For example, the power supply device 400 may be a battery pack of an electric vehicle, and a part of the energy stored in the battery pack may be used for wireless power transmission.

The power supply device 400 may be a separate component mounted on the vehicle 10 to store to be used for wireless power. In this case, the power supply device 400 may deliver a part of separately stored energy to the power storage module 104 of the wireless power transmission device 100. For example, the power supply device 400 may be a solar cell module attached to the ceiling of the vehicle 10, and a part of the energy stored in the solar cell module may be used for wireless power transmission.

The power supply device 400 may be a separate component located around the vehicle 10. In this case, the power supply device 400 may deliver stored energy to the power storage module 104 of the wireless power transmission device 100. For example, when the vehicle 10 is an electric vehicle, the power supply device 400 may be an electric charging station located on a road. The electric charging station may directly supply energy to the power storage module 104 through the power reception interface 106.

The power supply device 400 may be located inside the vehicle 10 according to a position. For example, the power supply device 400 may be located inside the vehicle 10 like the battery pack of the electric vehicle.

The power supply device 400 may be located outside the vehicle 10 according to a position. For example, the power supply device 400 may be attached onto a surface (e.g., a sunroof surface, a window, etc.) of the vehicle 10 like a solar cell module. The power supply device 400 may be located in a separate place other than the vehicle 10 like the electric charging station.

The power supply device 400 may wiredly or wirelessly deliver energy to the power storage module 104 of the wireless power transmission device 100. More specifically, the power supply device 400 may deliver energy through the power reception interface 106.

The wireless power transmission device 100 may be located inside the vehicle 10. The wireless power transmission device 100 may transmit wireless power to the multiple electronic devices **150-1, 150-2, 150-3, . . . , 150-*n* directly or through the repeater 130**.

The wireless power transmission device 100 may directly transmit wireless power to the electronic device 150-3 located inside the vehicle 10 without passing through the repeater 130. Due to a short transmission distance of the electronic device 150-3 inside the vehicle 10, wireless power may sufficiently arrive at the electronic device 150-3. The wireless power transmission device 100 may perform not only radiation in a way to broadly spread wireless power toward the electronic device 150-3, but also concentration in a way to concentrate wireless power on one point with a focus on the electronic device 150-3.

The wireless power transmission device 100 may transmit wireless power to the electronic devices **150-1, 150-2, . . . , 150-*n* outside the vehicle 10 through the repeater 130. Due to a long transmission distance of the electronic devices 150-1, 150-2, . . . , 150-*n* outside the vehicle 10, wireless power may not sufficiently arrive at the electronic devices 150-1, 150-2, . . . , 150-*n*. The wireless power transmission device 100 may radiate the wireless power toward the electronic devices 150-1, 150-2, . . . , 150-*n*, or concentrate the wireless power on one of the electronic devices 150-1, 150-2, . . . , 150-*n***.

The repeater 130 may relay the wireless power between the wireless power transmission device 100 and the multiple electronic devices **150-1, 150-2, 150-3, . . . , 150-*n***.

The repeater 130 may be located inside or outside the vehicle 10, and preferably, in at least a part of both surfaces of a body of the vehicle 10 or inside the body of the vehicle 10. The body may be formed of an alloy material and include a structure for protecting the inside of the vehicle 10. When the repeater 130 is located inside or outside the vehicle 10, it may be expressed by a block of the repeater 130 spanning a dotted boundary 410 between the inside and the outside of the vehicle 10. The boundary 410 may be formed by the body separating the inside and the outside of the vehicle 10.

The repeater 130 may relay the wireless power to the electronic devices **150-1, 150-2, . . . , 150-*n* located outside the vehicle 10. The repeater 130 may radiate or concentrate the wireless power to the electronic devices 150-1, 150-2, . . . , 150-*n***.

The repeater 130 may also relay the wireless power to the electronic device 150-3 located inside the vehicle 10. The repeater 130 may radiate or concentrate the wireless power to the electronic device 150-3.

Figure 5:
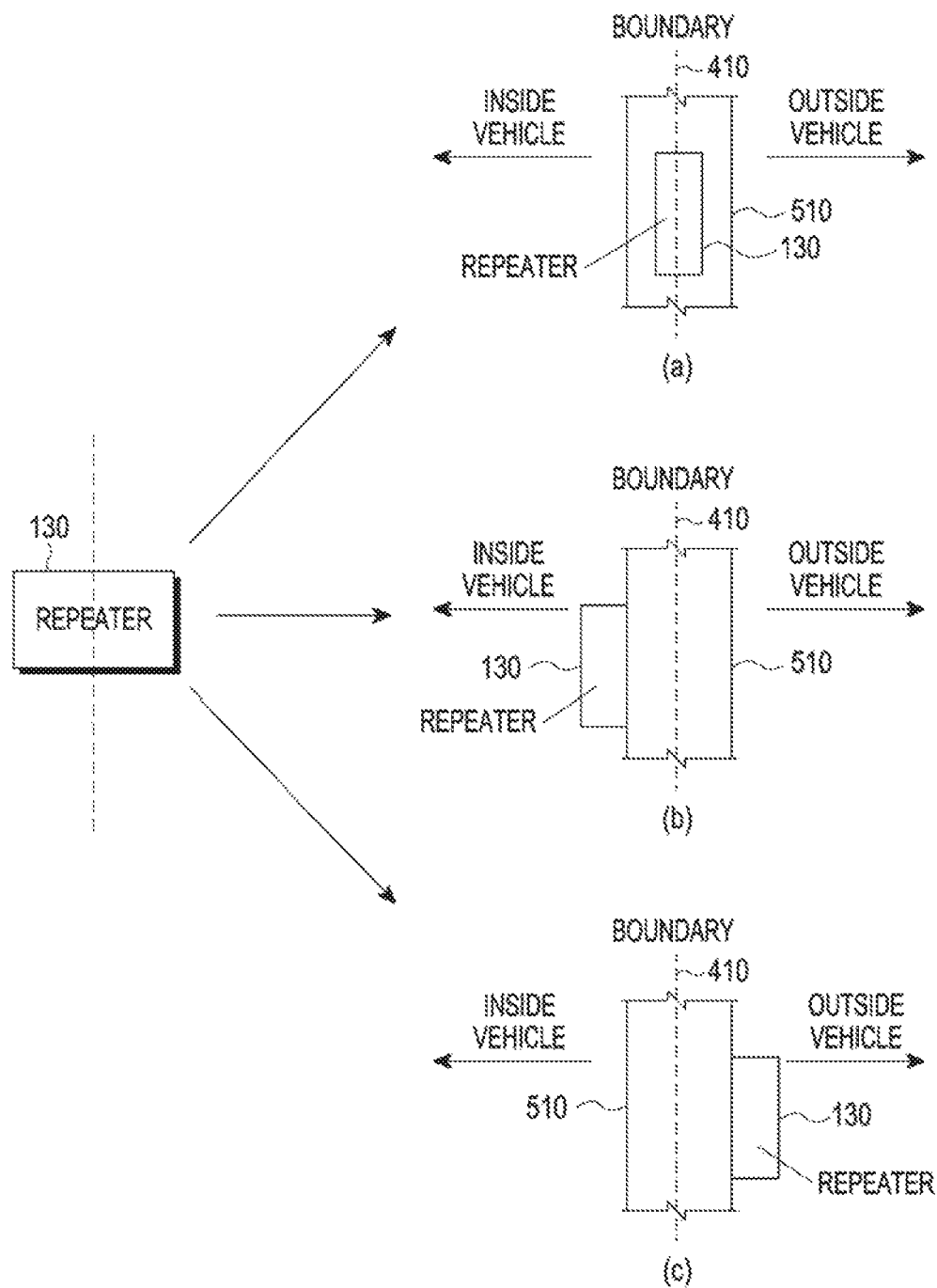
FIG. 5 illustrates a position of a repeater according to various embodiments of the present disclosure.
Figure 6:
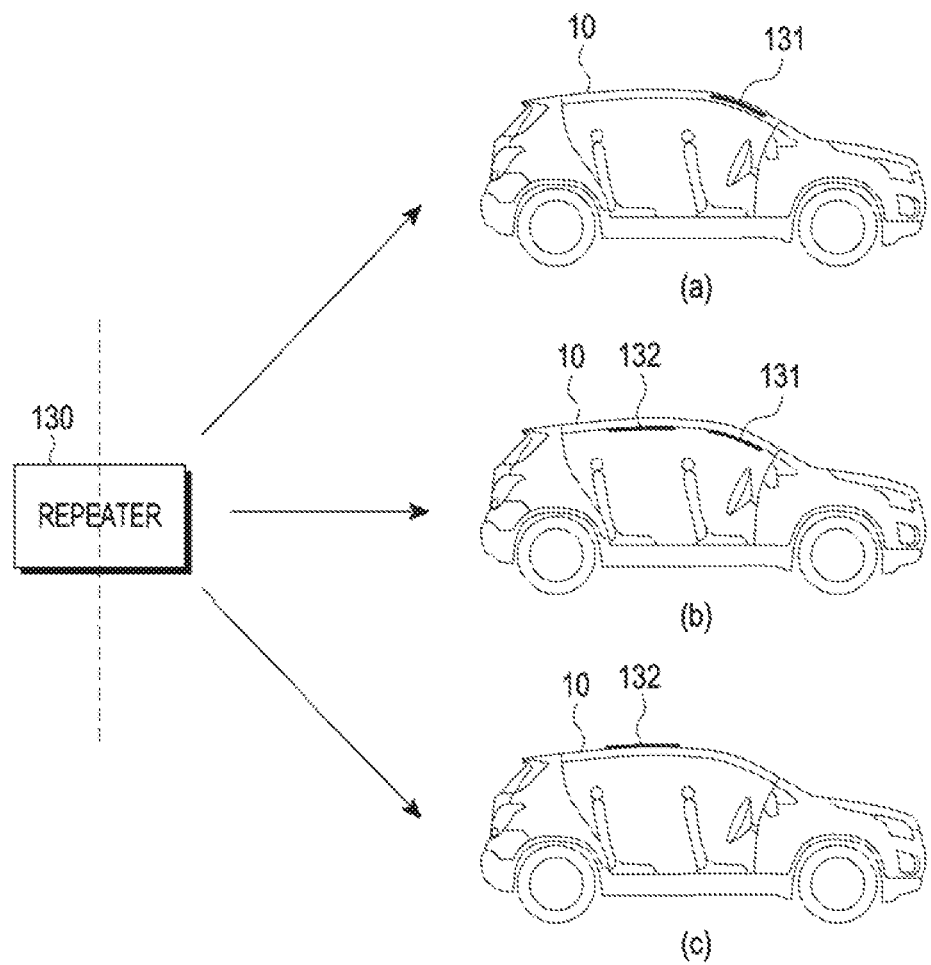
FIG. 6 illustrates a position of a repeater according to various embodiments of the present disclosure.

FIGS. 5 and 6 illustrate a position of a repeater according to various embodiments of the present disclosure. Referring to FIGS. 5 and 6, a description will be made.

Referring to FIGS. 5 and 6, a position where the repeater 130 is mounted is shown. The repeater 130 may be located inside the body, on an inner surface of the body, and an outer surface of the body.

FIG. 5A shows that the repeater 130 is included inside the body of the vehicle 10. The repeater 130 may be included as a part of the body. The body may be a structure of the vehicle 10, and may include a window (e.g., a front windshield or sunroof of the vehicle 10). For example, the repeater 130 may be manufactured in the form of a panel, and may constitute a window 510 together with a glass panel. Referring to FIG. 6A, a repeater 131 may be located as one of panels constituting the front windshield of the vehicle 10.

FIG. 5B shows that the repeater 130 is located on the inner surface of the body of the vehicle 10. That is, the repeater 130 may be located inside the vehicle 10. The repeater 130 may be attached to the inner surface of the body. For example, the repeater 130 may be manufactured in the form of a film, and the repeater 130 in the form of a film may be attached to the window 510 toward the inside of the vehicle 10. Referring to FIG. 6B, the repeater 131 may be attached to the inner surface of the front windshield of the vehicle 10. A repeater 132 may be attached to the inner surface of the sunroof.

FIG. 5C shows that the repeater 130 is located on the outer surface of the body of the vehicle 10. That is, the repeater 130 may be located outside the vehicle 10. The repeater 130 may be attached to the outer surface of the body. For example, the repeater 130 may be manufactured in the form of a film, and the repeater 130 in the form of a film may be attached to the window 510 toward the outside of the vehicle 10. Referring to FIG. 6C, the repeater 132 may be attached to the outer surface of the sunroof of the vehicle 10.

Figure 7:
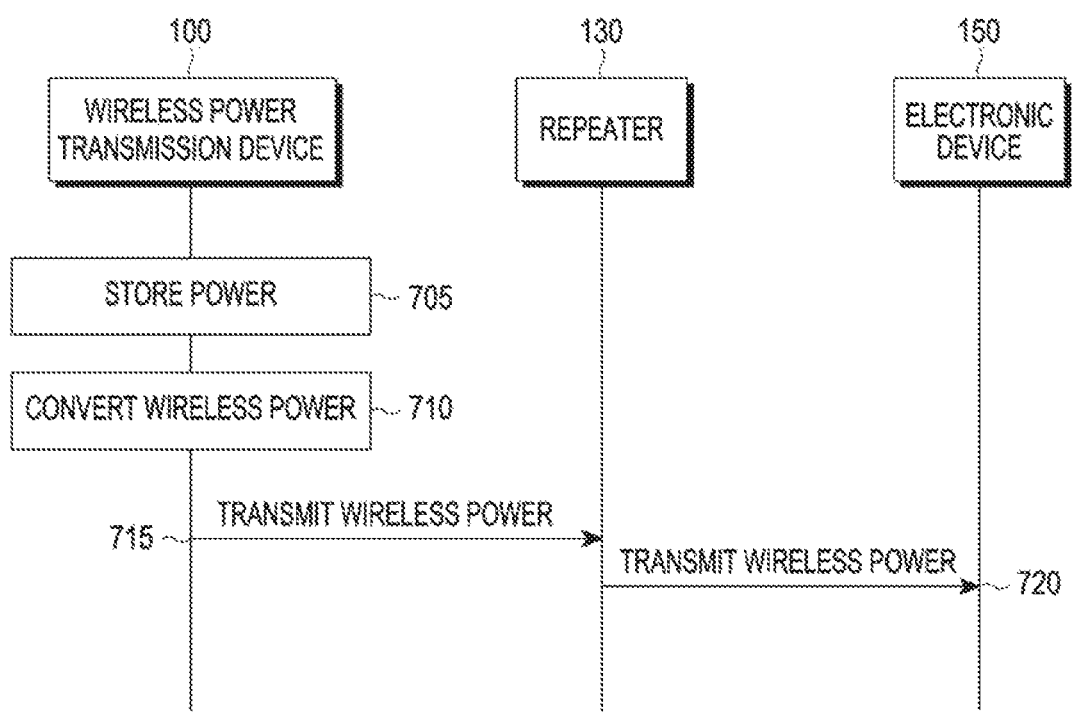
FIG. 7 is a flowchart illustrating a method for transmitting wireless power to an electronic device, according to various embodiments of the present disclosure.
Figure 8:
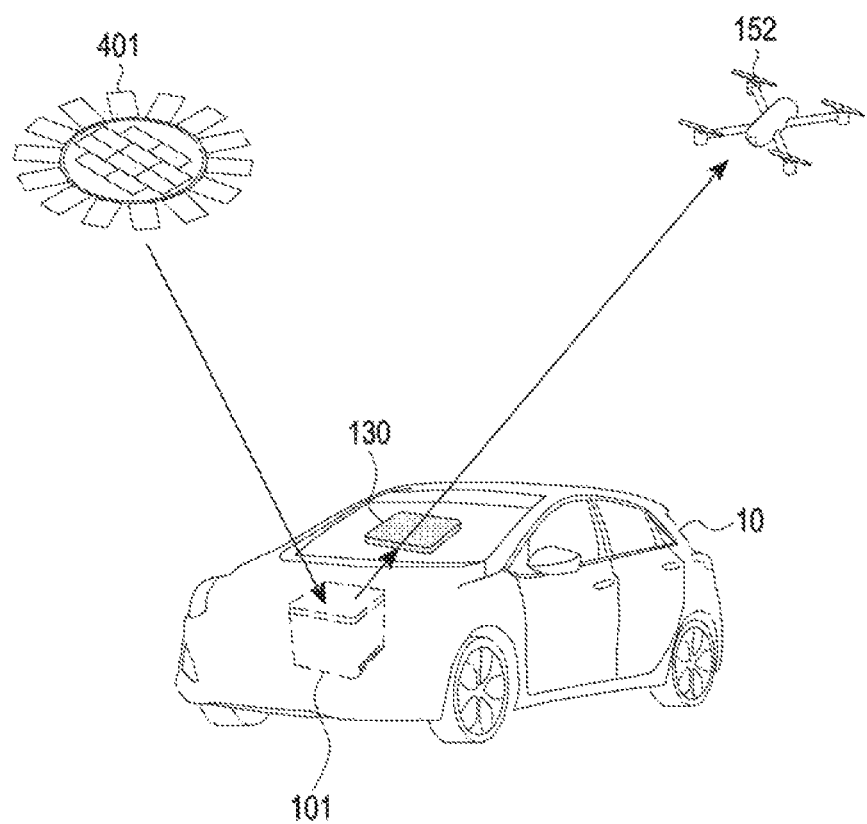
FIG. 8 is a diagram illustrating a method for transmitting wireless power to an electronic device, according to various embodiments of the present disclosure.

FIG. 7 is a flowchart illustrating a method for transmitting wireless power to an electronic device, according to various embodiments of the present disclosure. FIG. 8 is a diagram illustrating a method for transmitting wireless power to an electronic device, according to various embodiments of the present disclosure. Referring to FIGS. 7 and 8, a description will be made.

Shown in FIG. 7 is a flow of wireless power transmission among the wireless power transmission device 100, the repeater 130, and the electronic device 150. The wireless power transmission device 100 may include the IVWES 101, the power supply device 400 may include a solar cell panel 401 existing separately from the vehicle 10, and the electronic device 150 may include a drone 152.

The electronic device 150 may include a vehicle-driver/passenger communicator, a sensor and an actuator inside/outside the vehicle (e.g., a gyro sensor, a temperature sensor, a speaker, etc.), a black box, a navigator, a smart key, a smart baby seat, a camera, a camcorder, a storage, a golf navigator, an electric kickboard, a beam projector, a smart watch, smart glasses, a vehicle display, a game console, etc., as well as the drone 152.

The electronic device 150 may include a wearable/insertable/implantable device (e.g., a hearing aid, a pace maker, a robot, an electronic pet, etc.).

The electronic device 150 may include a portable electronic device (e.g., a tablet, a laptop, a smartphone, etc.) that may be provided inside or outside the vehicle or used by a passenger.

The electronic device 150 may include an electronic device (e.g., hair management equipment, beauty equipment, and food management/cooking/storage equipment) used outside the vehicle 10. Electronic devices used outside the vehicle 10 may be electronic devices that may not be generally used due to inconvenience in power supply or wired connection.

The electronic device 150 may include an electronic device (e.g., an emergency lamp switch and a vehicle-associated drone) used outside the vehicle 10 in association with the vehicle 10. In addition, the electronic device 150 may include a driver, a passenger, or any electronic device associated therewith.

In operation 705, the wireless power transmission device 100 may receive energy from the power supply device 400 and store power in the power storage module 104. The solar cell panel 401 may supply the power to the IVWES 101. The solar cell panel 401 may be located in a space that is different from that of the vehicle 10. The IVWES 101 transmitting the wireless power may also be supplied with a power source from the solar cell panel 401 wirelessly.

In operation 710, the wireless power transmission device 100 or the IVWES 101 may convert power stored in the power storage module 104 according to a wireless power transmission scheme. For example, for wireless power transmission using the magnetic inductive scheme, the wireless power transmission device 100 may convert the stored power into a magnetic field. For wireless power transmission using the electromagnetic scheme, the wireless power transmission device 100 may convert the stored power into an RF (e.g., electromagnetic waves).

In operation 715, the wireless power transmission device 100 may wirelessly transmit power to the repeater 130. The IVWES 101 may wirelessly transmit power to the repeater 130. For example, the wireless power transmission device 100 may transmit the magnetic field or the RF to the repeater 130.

In operation 720, the repeater 130 may transmit the power received from the wireless power transmission device 100 to the electronic device 150. The repeater 130 may transmit the power received from the IVWES 101 to the drone 152. For example, the repeater 130 may transmit the magnetic field or the RF to the electronic device 150.

Figure 9:
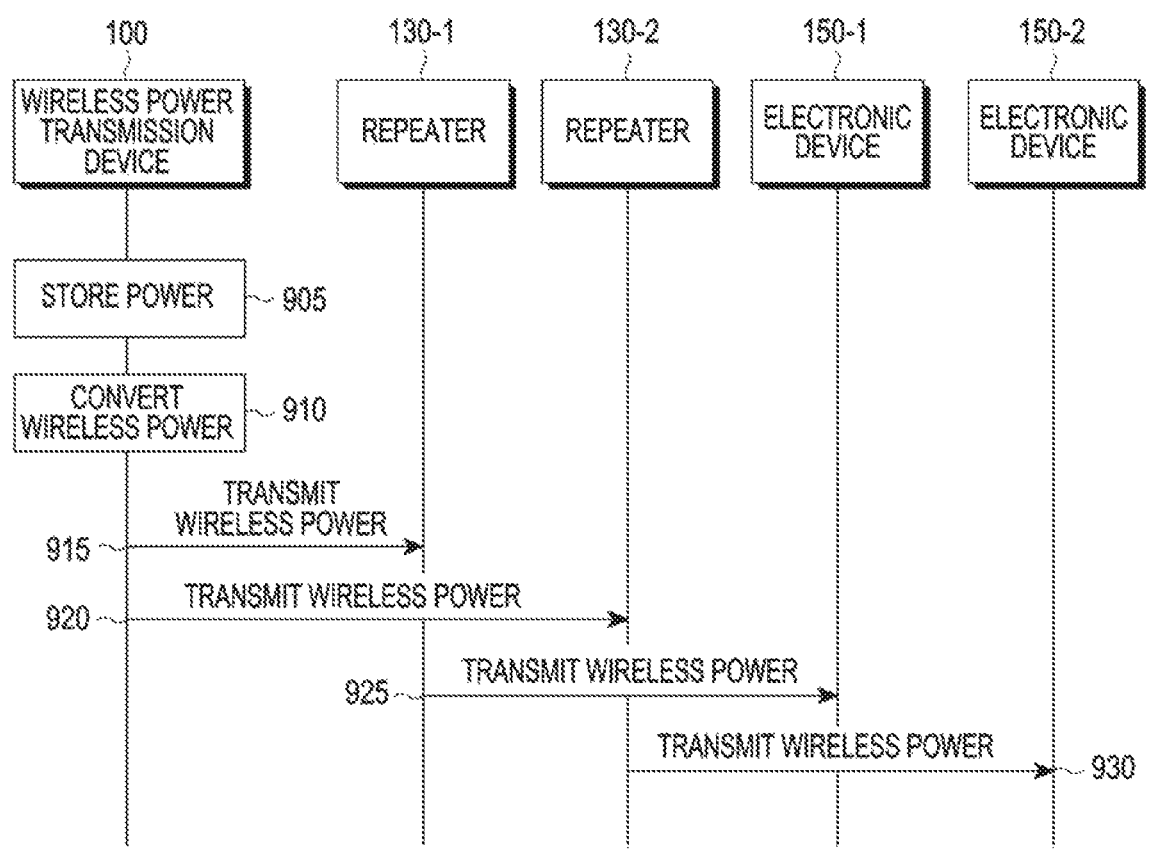
FIG. 9 is a flowchart illustrating a method for transmitting wireless power to an electronic device, according to various embodiments of the present disclosure.

FIG. 9 is a flowchart illustrating a method for transmitting wireless power to an electronic device, according to various embodiments of the present disclosure.

Shown in FIG. 9 is a flow of wireless power transmission from the wireless power transmission device 100 to the multiple electronic devices 150-1 and 150-2 through multiple repeaters 130-1 and 130-2.

In operation 905, the wireless power transmission device 100 may receive energy from the power supply device 400 and store power in the power storage module 104.

In operation 910, the wireless power transmission device 100 may convert power stored in the power storage module 104 according to a wireless power transmission scheme. More specifically, the wireless power transmission device 100 may convert power to transmit wireless power to the multiple repeaters 130-1 and 130-2 using the same scheme. The wireless power transmission device 100 may convert power to transmit wireless power to the multiple repeaters 130-1 and 130-2 using different schemes. For example, the wireless power transmission device 100 may convert stored power into a magnetic field to transmit wireless power to the multiple repeaters 130-1 and 130-2 using the magnetic inductive scheme. The wireless power transmission device 100 may convert stored power into a magnetic field and an RF to transmit wireless power to the multiple repeaters 130-1 and 130-2 using the magnetic inductive scheme and an RF scheme.

In operation 915, the wireless power transmission device 100 may wirelessly transmit power to the repeater 130-1.

In operation 920, the wireless power transmission device 100 may wirelessly transmit power to the repeater 130-2.

For example, the wireless power transmission device 100 may transmit wireless power to the multiple repeaters 130-1 and 130-2 using the magnetic inductive scheme. The wireless power transmission device 100 may respectively transmit wireless power to the repeater 130-1 by using the magnetic inductive scheme and to the repeater 130-2 by using the electromagnetic scheme.

In operation 925, the repeater 130-1 may wirelessly transmit power to the electronic device 150-1.

In operation 920, the repeater 130-2 may wirelessly transmit power to the electronic device 150-2.

For example, the repeater 130-1 may transmit wireless power to the electronic device 150-1 by using the magnetic inductive scheme, and the repeater 130-2 may transmit wireless power to the electronic device 150-2 by using the magnetic inductive scheme. The repeater 130-1 may transmit wireless power to the electronic device 150-1 by using the magnetic inductive scheme, and the repeater 130-2 may transmit wireless power to the electronic device 150-2 by using the electromagnetic scheme.

Figure 10:
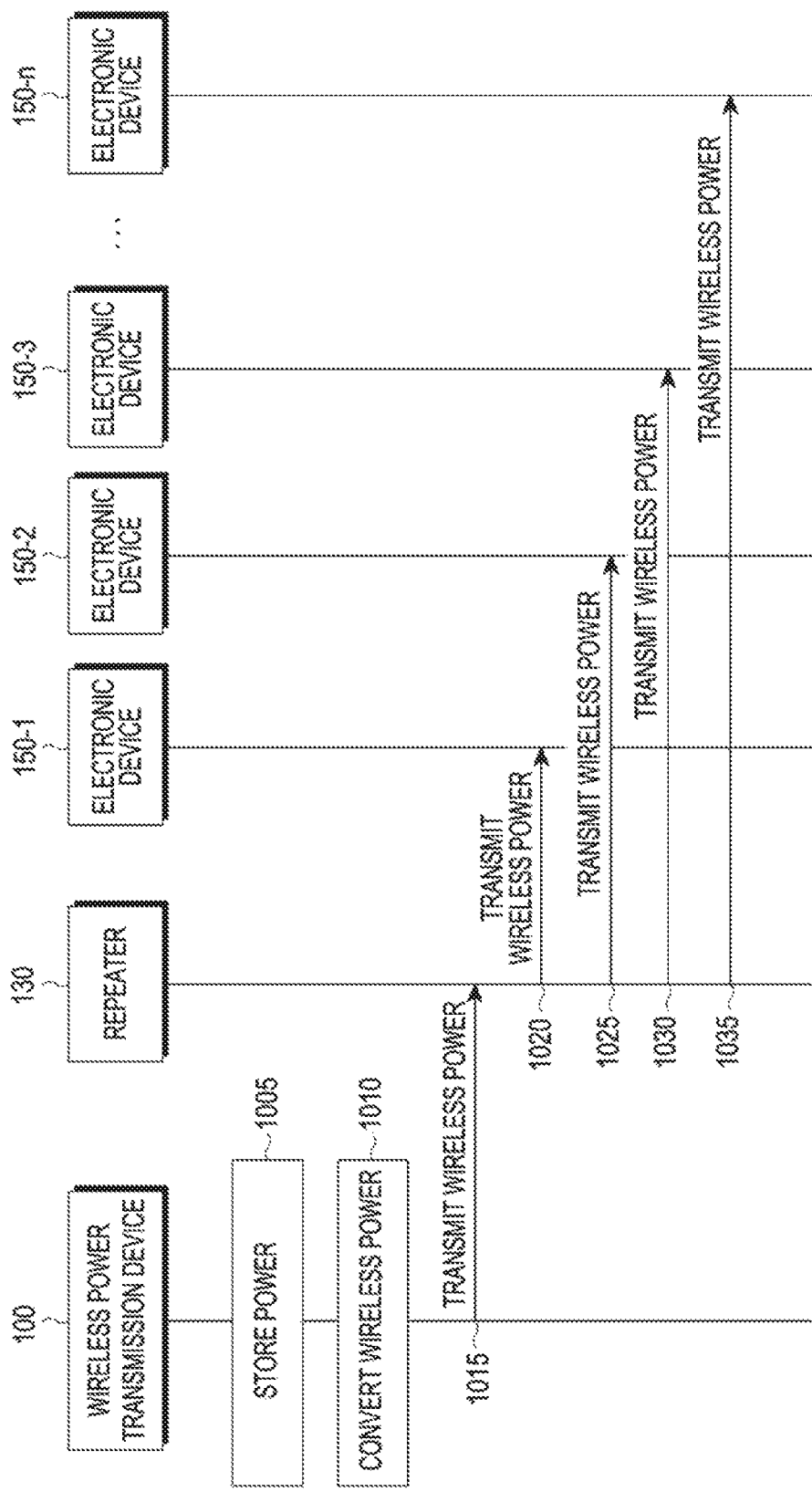
FIG. 10 is a flowchart illustrating a method for transmitting wireless power to an electronic device, according to various embodiments of the present disclosure.
Figure 11:
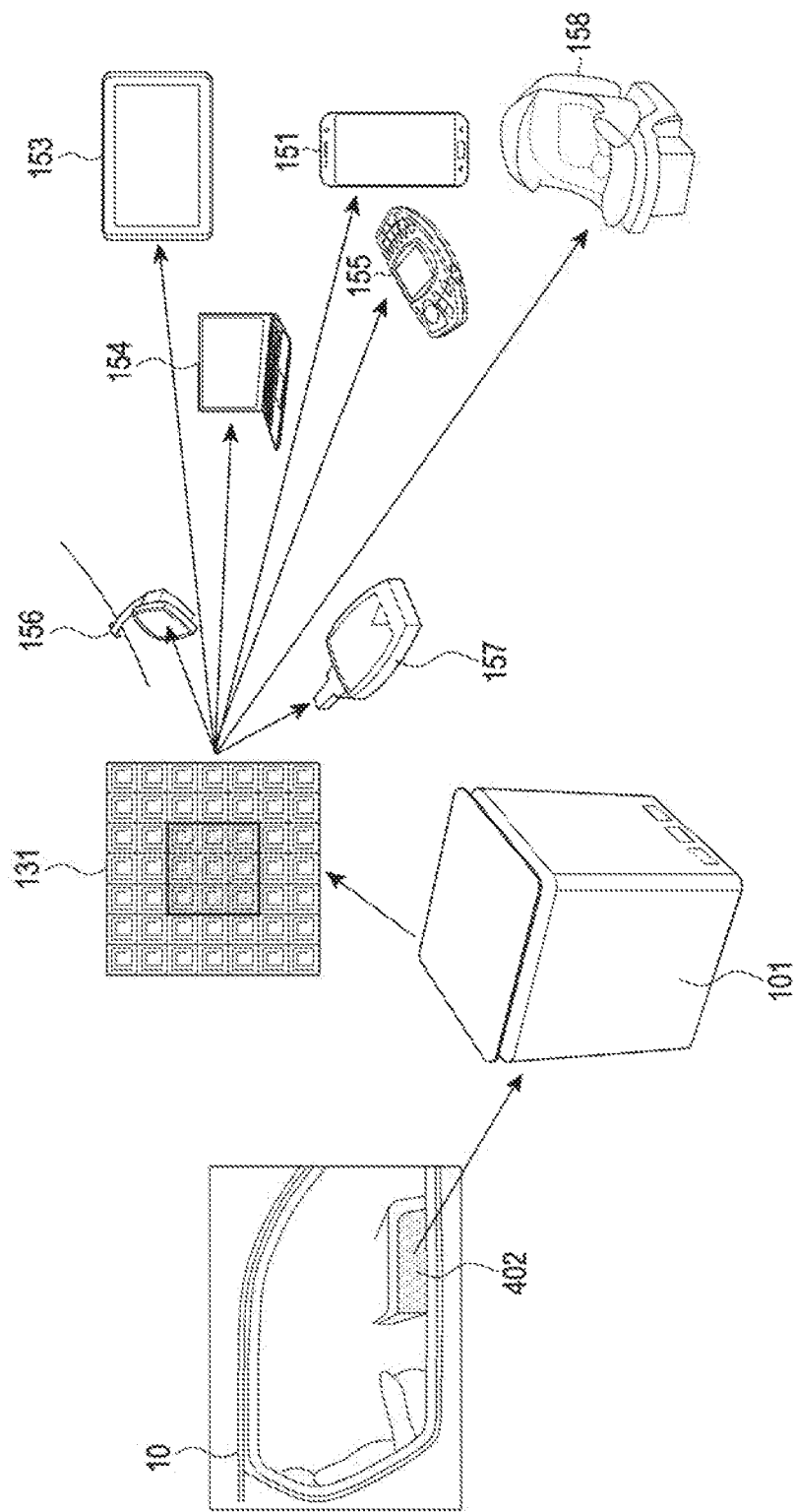
FIG. 11 is a structural diagram illustrating a method for transmitting wireless power to an electronic device, according to various embodiments of the present disclosure.

FIG. 10 is a flowchart illustrating a method for transmitting wireless power to an electronic device, according to various embodiments of the present disclosure. FIG. 11 is a structural diagram illustrating a method for transmitting wireless power to an electronic device, according to various embodiments of the present disclosure. Referring to FIGS. 10 and 11, a description will be made.

Shown in FIG. 10 is a flow of wireless power transmission of the repeater 131 to the multiple electronic devices 150-1, 150-2, 150-3, . . . , 150-n.

Referring to FIG. 11, the wireless power transmission device 100 may include the IVWES 101, the power supply device 400 may include a vehicle battery 402 located inside the vehicle 10, and the multiple electronic devices 150-1, 150-2, 150-3, . . . , 150-n may include a smartphone 151, a tablet 153, a laptop 154, a game console 155, a black box 156, a smart key 157, a smart baby seat 158, etc.

In operation 1005, the wireless power transmission device 100 may receive energy from the power supply device 400 and store power in the power storage module 104. A vehicle battery 402 may supply the power to the IVWES 101. The vehicle battery 402 may be located inside the vehicle 10. The IVWES 101 may be wiredly or wirelessly supplied with energy from the vehicle battery 402.

In operation 1010, the wireless power transmission device 100 or the IVWES 101 may convert power stored in the power storage module 104 according to a wireless power transmission scheme. For example, for wireless power transmission using the magnetic inductive scheme, the wireless power transmission device 100 may convert the stored power into a magnetic field. For wireless power transmission using the electromagnetic scheme, the wireless power transmission device 100 may convert the stored power into an RF (e.g., electromagnetic waves).

In operation 1015, the wireless power transmission device 100 may wirelessly transmit power to the repeater 130. For example, the wireless power transmission device 100 may transmit the magnetic field or the RF to the repeater 130. The IVWES 101 may transmit wireless power to the repeater 131. The repeater 131 may include a meta material, as will be described later.

In operations 1020 through 1035, the repeater 130 may transmit the power received from the wireless power transmission device 100 to the multiple electronic devices 150-1, 150-2, 150-3, . . . , 150-*n*. For example, the repeater 130 may transmit the magnetic field or the RF to the electronic device 150. The repeater 131 may transmit the power received from the IVWES 101 to the smartphone 151, the tablet 153, the laptop 154, the game console 155, the black box 156, the smart key 157, the smart baby seat 158, etc.

In operation 1020, the repeater 130 may transmit wireless power to the electronic device 150-1.

In operation 1025, the repeater 130 may transmit wireless power to the electronic device 150-2.

In operation 1030, the repeater 130 may transmit wireless power to the electronic device 150-3.

In operation 1035, the repeater 130 may transmit wireless power to the electronic device 150-*n*.

Figure 12:
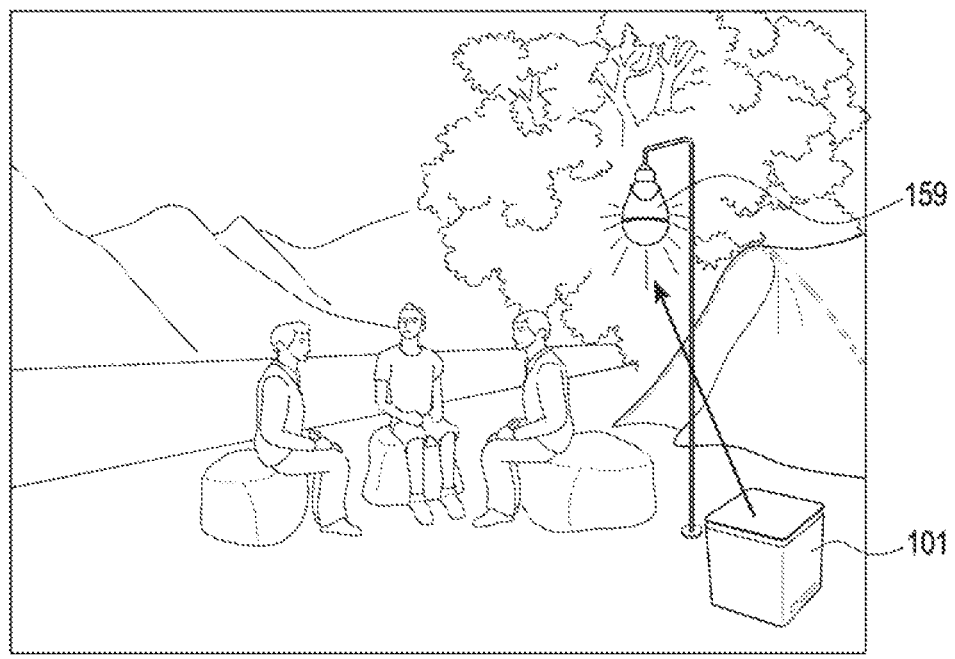
FIG. 12 is a view for describing a function of a wireless power transmission device, according to various embodiments of the present disclosure.

FIG. 12 is a view for describing a function of a wireless power transmission device, according to various embodiments of the present disclosure.

Referring to FIG. 12, the wireless power transmission device 100 may include an additional function other than wireless power transmission. The wireless power transmission device 100 is located inside the vehicle 10, but is attachable to or detachable from the vehicle 10, thus being separated from the vehicle 10. The IVWES 101 as one of the wireless power transmission device 100 may provide a function useful for outdoor activities of the user.

During the outdoor activities of the user, the IVWES 101 may transmit wireless power to an electronic light 159 at night, allowing the user to secure a view.

The IVWES 101 may interact with the user through voice. The IVWES 101 may receive user's voice through a microphone and convert the voice into a digital signal, and the control module 102 may execute a command corresponding to the user's voice based on the digital signal. The control module 102 may control a speaker to output an execution result through voice.

The IVWES 101 may store a music file in the memory 105. The control module 102 may execute a music file based on a command received from the user, and output the music file through the speaker.

The IVWES 101 may include a flash to provide light to the user. An illumination sensor may detect a brightness of light outside the IVWES 101, and the control module 102 may control the flash to emit light when the detected brightness is less than a threshold value.

The IVWES 101 may include a beam projector and store a moving image file. The control module 102 may search for a moving image file and control the beam projector to output the moving image file.

The IVWES 101 may implement a heating or cooling function. More specifically, the IVWES 101 may include a Peltier element to control a temperature inside or outside the IVWES 101. The control module 102 may control the Peltier element to absorb or emit heat according to a direction of current, thus increasing or reducing a temperature inside or outside the IVWES 101.

The IVWES 101 may also function as a data storage space. The communication module 103 of the IVWES 101 may receive data from the black box 156 and store the received data in the memory 105.

Figure 13:
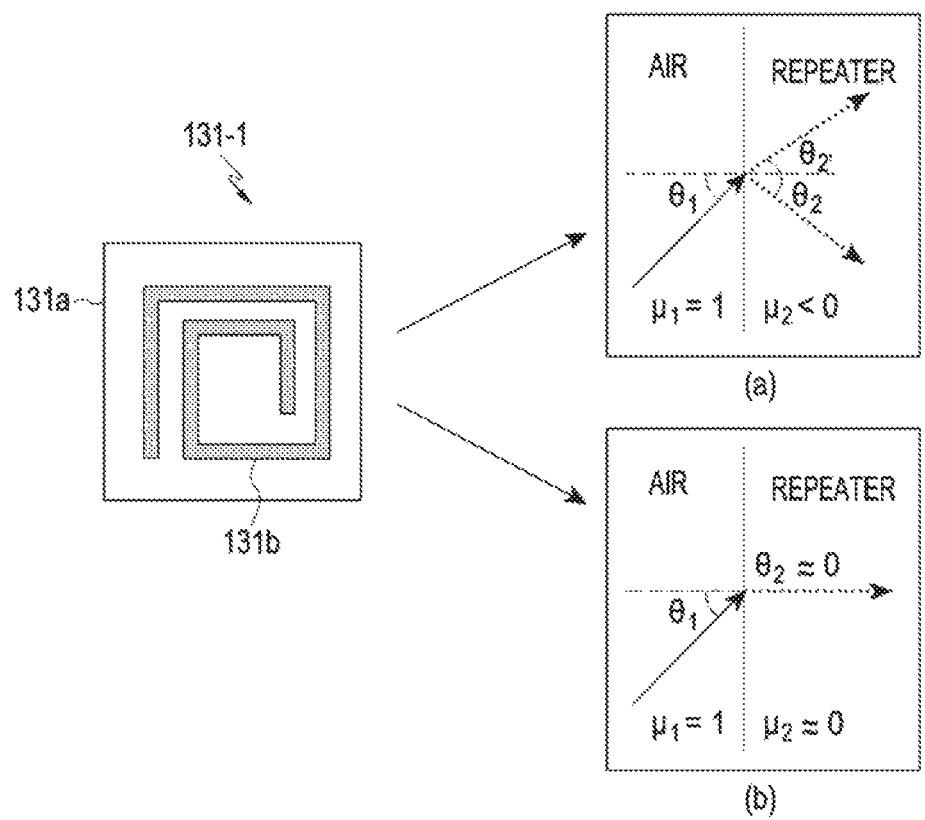
FIG. 13 is a structural diagram illustrating a repeater according to various embodiments of the present disclosure.
Figure 14:
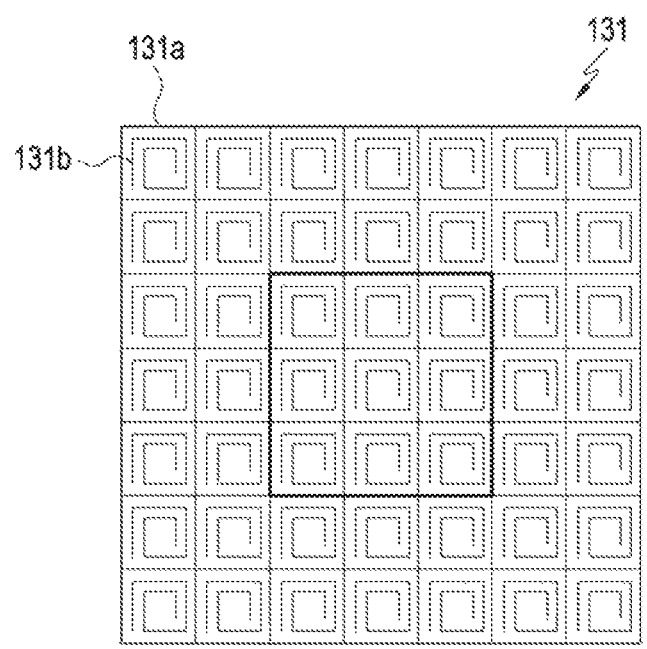
FIG. 14 is a structural diagram illustrating a repeater according to various embodiments of the present disclosure.

FIGS. 13 and 14 are structural diagrams illustrating a repeater according to various embodiments of the present disclosure. Referring to FIGS. 13 and 14, a detailed structure of a repeater will be described.

The repeater 130 may be the repeater 131 formed of a meta material.

The repeater 131 may include a repeater member 131*a* that may be coupled to the vehicle 10 or may be inserted to the inside of the body of the vehicle 10. The repeater member 131*a* may be a substrate including a printed circuit board (PCB), and may include a pattern 131*b* engraved on the surface thereof.

Referring to FIG. 14, the repeater 131 may include the repeater member 131*a* and a plurality of patterns 131*b* formed on the repeater member 131*a*. For example, the repeater 131 may include a total of 7×7=49 patterns 131*b* on the repeater member 131*a*. The repeater 131 having a total of 49 patterns 131*b* may receive power from the wireless power transmission device 100 and transmit the received power to the electronic device 150. More specifically, the repeater 131 having a total of 49 patterns 131*b* may provide at least one of an electric field or a magnetic field delivered from the wireless power transmission device 100 to the electronic device 150.

The repeater 131 may control the electric field or the magnetic field in a particular direction and transmit the controlled electric field or magnetic field to the target electronic device 150. By control in a particular direction, the repeater 131 may perform power transmission by radiation of widely spreading power to the electronic device 150 or by concentration of concentrating power on a point. Control of the electric field or the magnetic field in a particular direction by the repeater 131 may be implemented by a feature that the repeater 131 is formed of a meta material having negative or zero permittivity and negative or zero permeability.

A unit repeater 131-1 as a part of the repeater 131 and an entity of the repeater 131 may include one pattern 131*b*. The pattern 131*b* may be formed in a spiral shape having several turns.

The unit repeater 131-1 may have a different permittivity and a permeability according to the number of turns. For example, when the pattern 131*b* has 14.5 turns, the unit repeater 131-1 may have negative permeability. For example, when the pattern 131*b* has 18 turns, the unit repeater 131-1 may have zero permeability.

The unit repeater 131-1 having negative permittivity or negative permeability may change the traveling direction of the electric field or the magnetic field to be refracted at a negative refraction angle. That is, the unit repeater 131-1 may change the direction of the electric field or the magnetic field in a reverse direction.

For example, referring to FIG. 13A, when the magnetic field is incident to the unit repeater 131-1 having a permeability of $\mu_2$ in the air having a permeability of $\mu_1$, the traveling direction of the magnetic field may be changed. Herein, $\mu_1=1$ and $\mu_2<0$, that is, the permeability of the air is 0 and the unit repeater 131-1 may be formed of a meta material having a negative permeability. In a general material having a positive permeability, the magnetic field incident at an incident angle of $\theta_1$ may be refracted at a refraction angle of $\theta_{2'}$. In a general material having a positive permeability, the magnetic field incident at an incident angle of $\theta_1$ may be refracted at a refraction angle of $\theta_{2'}$. Herein, $\theta_2$ and $\theta_{2'}$ may be respectively defined as a negative refraction angle and a positive refraction angle. When the magnetic field travels at a refraction angle of $\theta_{2'}$, the magnetic field may travel in an incident direction; when the magnetic field travels at a refraction angle of $\theta_2$, the magnetic field may travel in a direction opposite to the incident direction thereof. Thus, when the magnetic field passes through the unit repeater 131-1, the magnetic field may travel in a direction opposite to the traveling direction in the air.

The unit repeater 131-1 having zero permittivity or zero permeability may change the traveling direction of the electric field or the magnetic field to be refracted at a zero refraction angle. That is, the unit repeater 131-1 may change the direction of the electric field or the magnetic field to go straight.

For example, referring to FIG. 13B, under the same condition as in FIG. 13A, the magnetic field incident at the incident angle of $\theta_1$ to the unit repeater 131-1 including the meta material having a zero permeability in the air may be refracted at a refraction angle of $\theta_2$ in the unit repeater 131-1. However, in the unit repeater 131-1 having a zero permeability, $\theta_2$ may be zero or near zero. Thus, for a zero or near-zero refraction angle $\theta_2$, when the magnetic field passes through the unit repeater 131-1, the magnetic field may go straight, that is, travel in parallel with a normal line (dotted line) forming $\theta_1$ with the traveling direction in the air.

The above-described change of the traveling direction of the magnetic field may also be applied to the electric field, without being limited to the magnetic field.

The repeater 131 may include a plurality of formed unit repeaters 131-1. Thus, the repeater 131 may have characteristics of direction control of the electric field or the magnetic field according to permittivity or permeability. For example, referring to FIG. 14, when all of the 49 unit repeaters 131-1 constituting the repeater 131 have a negative permeability, the repeater 131 may change the magnetic field at a negative refraction angle, that is, in a direction opposite to the incident direction. When all of the 49 unit repeaters 131-1 constituting the repeater 131 have a zero permeability, the repeater 131 may change the magnetic field to go straight in a horizontal direction, regardless of the incident direction of the magnetic field.

Meanwhile, the repeater 131 may be located inside the vehicle 10, outside the vehicle 10, and inside the body. The body may be a steel structure of the vehicle 10, and the body may include a window like a front windshield.

For example, when the repeater 131 is located inside the vehicle 10, the repeater 131 may be attached to a surface of the body, which is oriented toward the inside of the vehicle 10. The repeater 131 may further include an adhesive plastic film in addition to the repeater member 131a and the pattern 131b. The repeater 131 may be attached to an inner surface of the window, that is, a face oriented toward the inside of the vehicle 10 by means of a plastic film, thus being coupled with the vehicle 10. The pattern 131b may be directly deposited on a surface of the body, which is oriented toward the inside of the vehicle 10.

For example, when the repeater 131 is located outside the vehicle 10, the repeater 131 may be attached to a surface of the body, which is oriented toward the outside of the vehicle 10. The repeater 131 may further include an adhesive plastic film in addition to the repeater member 131a and the pattern 131b. The repeater 131 may be attached to an outer surface of the window, that is, a face oriented toward the outside of the vehicle 10 by means of a plastic film, thus being coupled with the vehicle 10. The pattern 131b may be directly deposited on a surface of the body, which is oriented toward the outside of the vehicle 10.

For example, when the repeater 131 is located inside the body of the vehicle 10, the repeater 131 may be formed as a part of the body together with the body. The repeater member 131a in which the pattern 131b is formed may be formed integrally with the body inside the body. The repeater member 131a of the repeater 131 may be glass that is a material of the window, the pattern 131b may be formed in the glass, and the glass having the pattern 131b formed therein may function as the window.

The repeater 131 may be formed in a plurality of positions of the vehicle 10. For example, when the repeater 131 is attached to the window or included inside as a part of the window, the repeater 131 may be located in the front windshield and the sunroof. The position of the repeater 131 may change with a position where the electronic device 150 to transmit and receive wireless power is located. The position of the repeater 131 is not limited to the above example, and may be any one of the inside of the vehicle 10, the outside of the vehicle 10, and the inside of the body as long as the position does not shield the electric field or the magnetic field.

The pattern 131b of the repeater 131 may include a conductive material. The pattern 131b may include, as the conductive material, at least one of graphene or carbon nano tube. For example, when the repeater 131 is coupled to a transparent window, the pattern 131b may be a graphene material having conductivity and transparency. Even when the repeater 131 is coupled to a transparent window, the pattern 131b may include a carbon nano tube material having conductivity. When the opaque pattern 131b using a carbon nano tube, etc., is used, a particular pattern may be formed in the window to improve the exterior of the vehicle 10 and contribute to information delivery.

Figure 15:
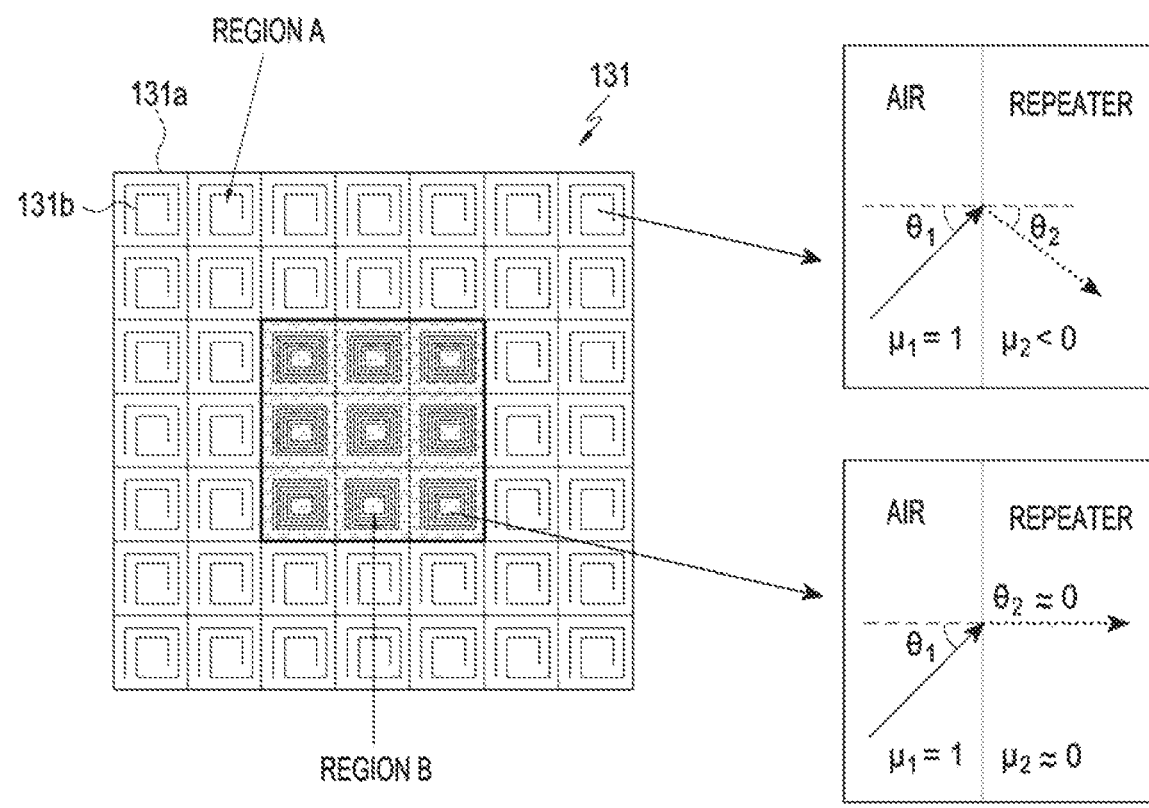
FIG. 15 is a structural diagram illustrating a repeater according to various embodiments of the present disclosure.

FIG. 15 is a structural diagram illustrating a repeater according to various embodiments of the present disclosure.

Referring to FIG. 15, the repeater 131 may include a region having negative permittivity and permeability and a region having zero permittivity and permeability. The region may include the unit repeater 131-1 having a different pattern according to permittivity and permeability.

For example, the repeater 131 may include a region A and a region B including the plurality of unit repeaters 131-1. The region A may be located at a circumference around the center of the repeater 131 and may include the unit repeaters 131-1 having negative permeability and a first pattern causing negative permeability. The region B may be located in the center of the repeater 131 and may include the unit repeaters 131-1 having zero permeability and a second pattern causing zero permeability. Thus, the repeater 131 may change the traveling direction of the magnetic field passing through the region A at a negative refraction angle $\theta_2$, i.e., in the opposite direction, and change the traveling direction of the magnetic field passing through the region B at a zero refraction angle $\theta_2$, i.e., in a straight direction.

The repeater 131 may change an electric field and/or a magnetic field according to how to arrange regions including the unit repeaters 131-1, and may control a direction of wireless power delivered from the wireless power transmission device 100 according to the changed electric field and/or magnetic field. For example, the repeater 131 may deliver, i.e., relay wireless power from the wireless power transmission device 100 to the multiple electronic devices 150-1, 150-2, 150-3, . . . , 150-n distributed in different directions as well as the electronic device 150.

The repeater 131 may change an electric field and/or a magnetic field according to how to arrange regions including the unit repeaters 131-1, and may control a transmission scheme for wireless power delivered from the wireless power transmission device 100 according to the changed electric field and/or magnetic field. For example, the repeater 131 may radiate wireless power by widely spreading the electric field or the magnetic field to the electronic device 150. The repeater 131 may concentrate wireless power by concentrating the electric field or the magnetic field on the electronic device 150. This will be described later.

Figure 16A:
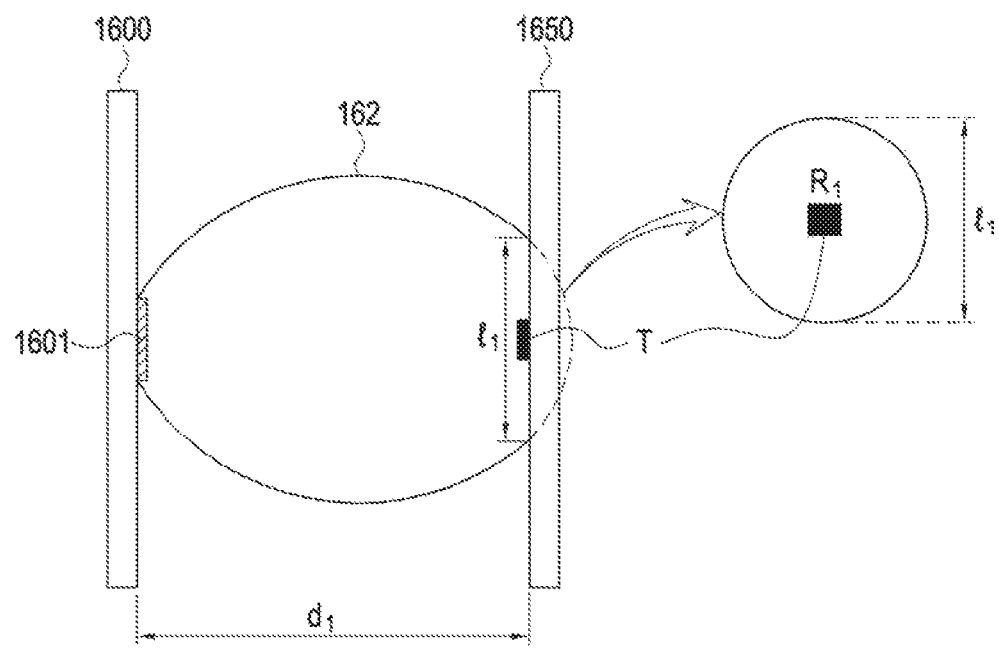
FIGS. 16A through 16C are views for describing wireless power transmission of a repeater based on a transmission scheme, according to various embodiments of the present disclosure.
Figure 16B:
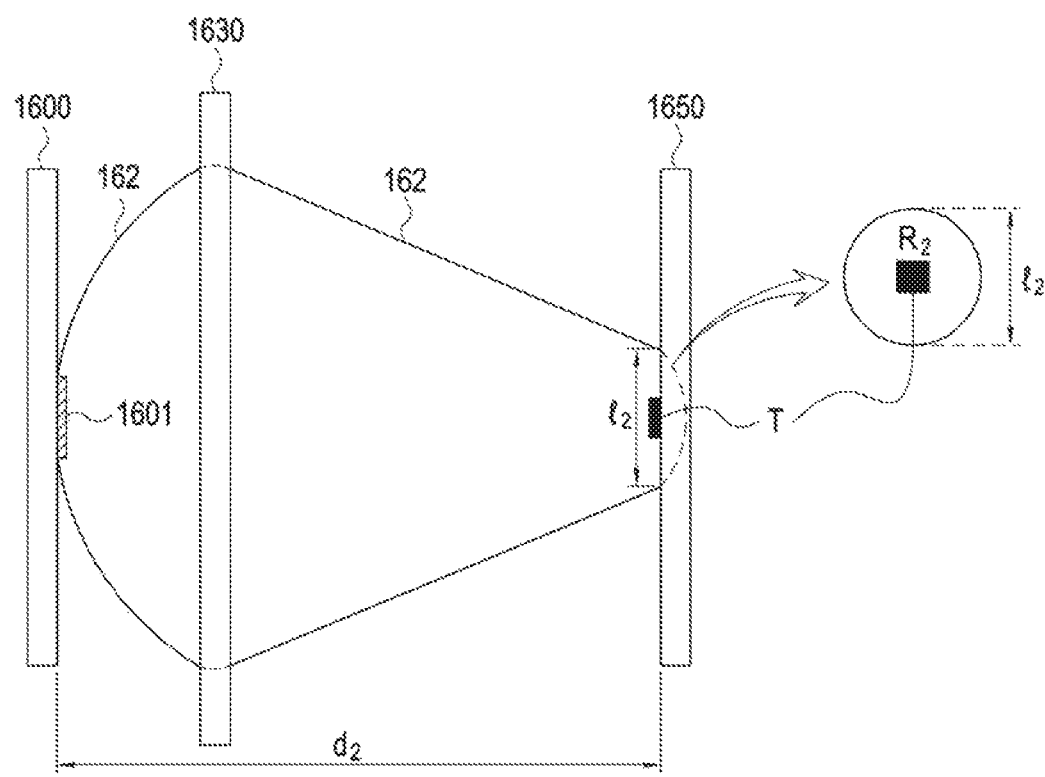
Figure 16C:
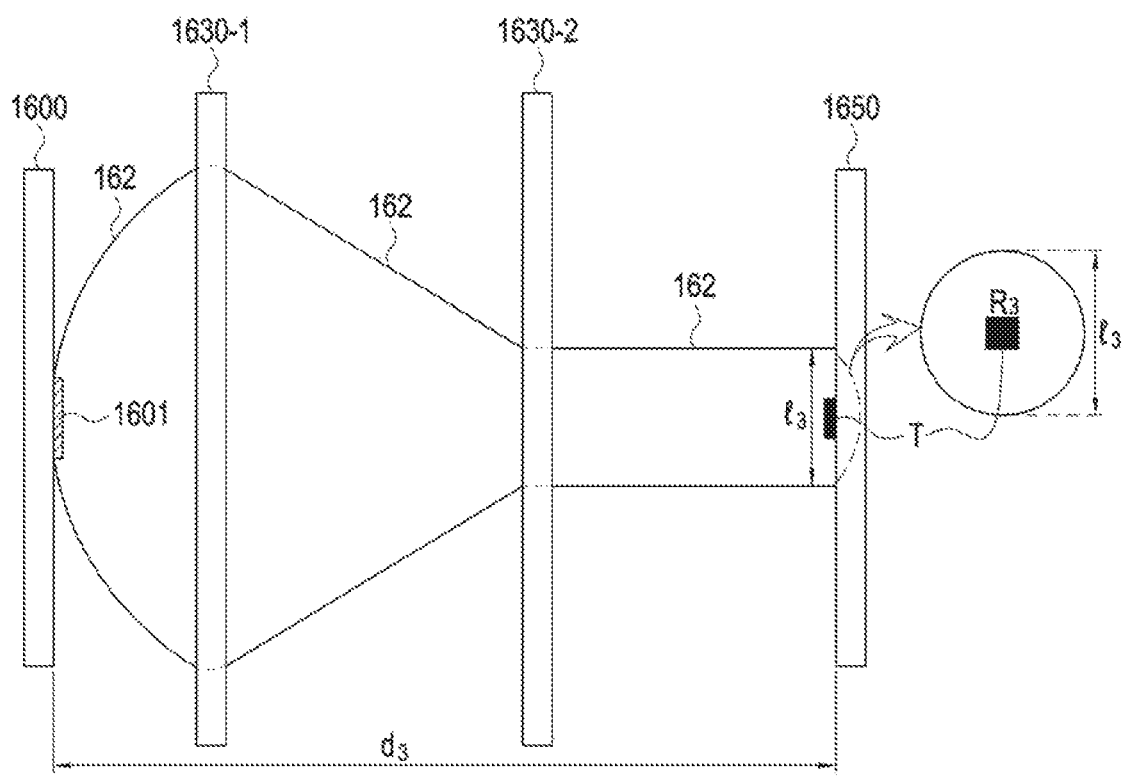

FIGS. 16A through 16C are conceptual diagrams of wireless power transmission of a repeater based on a transmission scheme, according to various embodiments of the present disclosure.

Referring to FIG. 16A, without intervention of the repeater 1630, a wireless power transmission device 1600 may transmit wireless power to an electronic device 1650. Without the repeater 1630 between the wireless power transmission device 1600 and the electronic device 1650, the wireless power transmission device 1600 may directly transmit wireless power to the electronic device 1650.

For example, through a power transmission module 1601, the wireless power transmission device 1600 may deliver a magnetic field 162 to the electronic device 1650 spaced apart from the wireless power transmission device 1600 by $d_1$. More specifically, the magnetic field 162 may be delivered toward a power reception module (not shown). In the above example, when the magnetic field 162 arrives at the power reception module of the electronic device 1600, the magnetic field 162 may be delivered in a shape and an area corresponding to a region $R_1$, and it is assumed that the region $R_1$ is a circle having a radius of $l_1$ and power delivered to a target T is $P_1$. The region $R_1$ may be a region at which the magnetic field 162 needs to arrive such that power may effectively arrive. Thus, the region $R_1$ may include a position of the power reception module or an area around the power reception module.

The magnetic field 162 may be emitted from the power transmission module 1601 of the wireless power transmission device 1600, and may be spread as emitted, i.e., in a direction of emission.

Referring to FIG. 16B, through the repeater 1630, the wireless power transmission device 1600 may transmit wireless power to the electronic device 1650. With the repeater 1630 between the wireless power transmission device 1600 and the electronic device 1650, the wireless power transmission device 1600 may concentrate wireless power on the electronic device 1650.

For example, through a power transmission module 1601, the wireless power transmission device 1600 may deliver a magnetic field 162 to the electronic device 1650 spaced apart from the wireless power transmission device 1600 by $d_2$. More specifically, the magnetic field 162 may be delivered toward a power reception module (not shown). In the above example, when the magnetic field 162 arrives at the power reception module of the electronic device 1600, the magnetic field 162 may be delivered in a shape and an area corresponding to a region $R_2$, and it is assumed that the region $R_2$ is a circle having a radius of $l_2$ and power delivered to a target T is $P_2$. The region $R_2$ may be a region at which the magnetic field 162 needs to arrive such that power may effectively arrive. Thus, the region $R_2$ may include a position of the power reception module or an area around the power reception module.

The magnetic field 162 may be emitted from the power transmission module 1601 of the wireless power transmission device 1600, and the traveling direction of the magnetic field 162 may be changed into a negative refraction angle, i.e., into the opposite direction when the magnetic field 162 passes through the repeater 1630. In this case, the repeater 1630 may be a group of the unit repeaters 131-1 having negative permeability. The magnetic field 162 having a direction changed into the opposite direction may arrive at the region $R_2$. Meanwhile, the magnetic field 162 is widely radiated in FIG. 16A, but the magnetic field 162 may be concentrated on the region $R_2$ due to a changed direction in FIG. 16B. The distance $d_2$ may be longer than the distance $d_1$ ($d_2 > d_1$), and an area of the region $R_2$ may be smaller than that of the region $R_1$ ($R_2 < R_1$). For the same total quantity of the magnetic field 162, i.e., the same total quantity of the power, the power $P_2$ delivered to the target T may be greater than $P_1$ by a reduction of the area of the region $R_2$ ($P_2 > P_1$). Thus, by using the repeater 1630, the wireless power transmission device 1600 may not only concentrate wireless power on the electronic device 150, but also control a transmission distance of the wireless power.

Referring to FIG. 16C, through a plurality of repeaters 1630-1 and 1630-2, the wireless power transmission device 1600 may transmit wireless power to the electronic device 1650. With the plurality of repeaters 1630-1 and 1630-2 between the wireless power transmission device 1600 and the electronic device 1650, the wireless power transmission device 1600 may concentrate or radiate wireless power on or to the electronic device 1650.

For example, through a power transmission module 1601, the wireless power transmission device 1600 may deliver a magnetic field 162 to the electronic device 1650 spaced apart from the wireless power transmission device 1600 by $d_3$. More specifically, the magnetic field 162 may be delivered toward a power reception module (not shown). In the above example, when the magnetic field 162 arrives at the power reception module of the electronic device 1600, the magnetic field 162 may be delivered in a shape and an area corresponding to a region $R_3$, and it is assumed that the region $R_3$ is a circle having a radius of $l_3$ and power delivered to a target T is $P_3$. The region $R_3$ may be a region at which the magnetic field 162 needs to arrive such that power may effectively arrive. Thus, the region $R_3$ may include a position of the power reception module or an area around the power reception module.

The magnetic field 162 may be emitted from the power transmission module 1601 of the wireless power transmission device 1600, and the traveling direction of the magnetic field 162 may be changed into a negative refraction angle, i.e., into the opposite direction when the magnetic field 162 passes through the repeater 1630-1. In this case, the repeater 1630-1 may be a group of the unit repeaters 131-1 having negative permeability. The magnetic field 162 having a direction changed into the opposite direction may arrive at the repeater 1630-2. When the magnetic field 162 passes through the repeater 1630-2, the traveling direction of the magnetic field 162 may be changed into a zero incident angle, i.e., into a straight direction. In this case, the repeater 1630-2 may be a group of the unit repeaters 131-1 having zero permeability. The magnetic field 162 having a direction changed into the straight direction may arrive at the region $R_3$.

Meanwhile, the magnetic field 162 is widely radiated in FIG. 16A and the magnetic field 162 may be concentrated narrowly in FIG. 16B, but the magnetic field 162 may be concentrated on the region $R_3$, and at the same time, be radiated due to two direction changes in FIG. 16C. That is, the magnetic field 162 may be partially concentrated by the repeater 1630-1, and may be partially radiated by the repeater 1630-2.

The distance $d_3$ may be longer than the distances $d_1$ and $d_2$ ($d_3 > d_2 > d_1$), and an area of the region $R_3$ may be smaller than that of the region $R_1$ and larger than that of the region $R_2$ ($R_1 > R_3 > R_2$). For the same total quantity of the magnetic field 162, i.e., the same total quantity of the power, the power $P_3$ delivered to the target T may be greater than $P_1$ and less than $P_2$ ($P_2 > P_3 > P_1$). Thus, by using the plurality of repeaters 1630-1 and 1630-2, the wireless power transmission device 1600 may not only concentrate and radiate wireless power on the electronic device 150, but also control a transmission distance of the wireless power.

Figure 17:
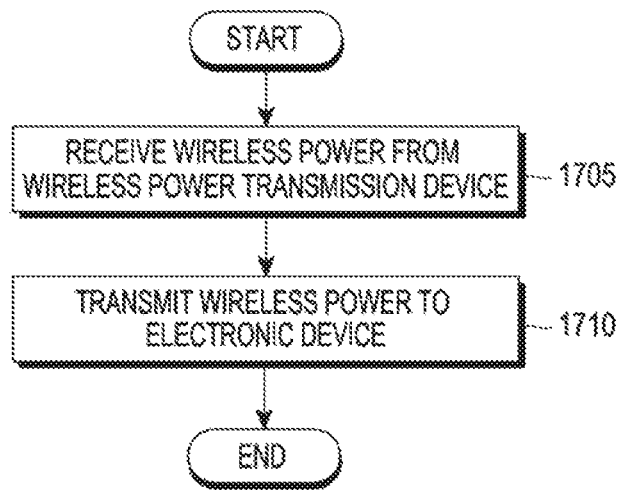
FIG. 17 is a flowchart illustrating a method for transmitting wireless power using a repeater, according to various embodiments of the present disclosure.

FIG. 17 is a flowchart illustrating a method for transmitting wireless power using a repeater, according to various embodiments of the present disclosure.

Shown in FIG. 17 is a flow of wireless power relay of the repeater 130 between the wireless power transmission device 100 and the electronic device 150.

In operation 1705, the repeater 130 may wirelessly receive power from the wireless power transmission device 100. More specifically, the repeater 130 may receive wireless power by using a meta material including the repeater 131a and the pattern 131b formed in the repeater member 131a.

In operation 1710, the repeater 130 may wirelessly transmit power to the electronic device 150. More specifically, the repeater 130 may transmit wireless power to the electronic device 150 by controlling the direction of the electric field or the magnetic field.

Figure 18:
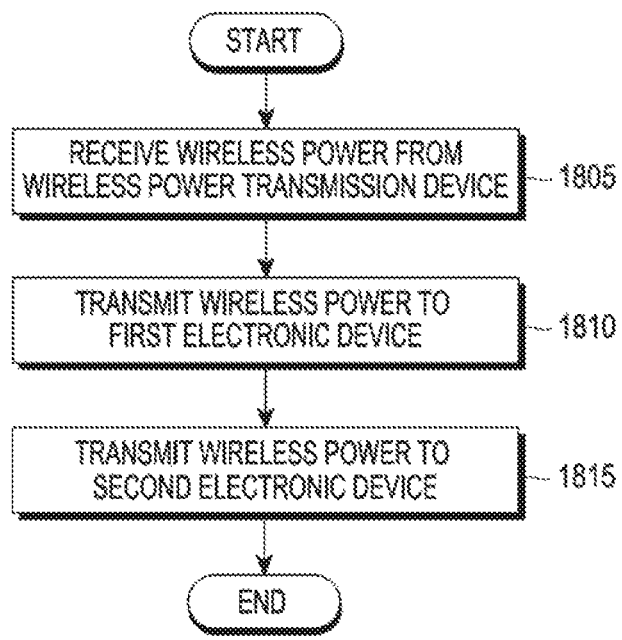
FIG. 18 is a flowchart illustrating a method for transmitting wireless power using a repeater, according to various embodiments of the present disclosure.

FIG. 18 is a flowchart illustrating a method for transmitting wireless power using a repeater, according to various embodiments of the present disclosure.

Shown in FIG. 18 is a flow of wireless power relay of the repeater 130 between the wireless power transmission device 100 and the multiple electronic devices 150-1, 150-2, 150-3, . . . , 150-n.

In operation 1805, the repeater 130 may wirelessly receive power from the wireless power transmission device 100.

In operations 1810 and 1815, the repeater 130 may wirelessly transmit power to the multiple electronic devices 150-1, 150-2, 150-3, . . . , 150-n. In operation 1810, the repeater 130 may transmit wireless power to a first electronic device. In operation 1815, the repeater 130 may transmit wireless power to a second electronic device. The repeater 130 may transmit wireless power to the first electronic device and the second electronic device at the same time or with a time difference therebetween.

More specifically, the repeater 130 may be configured to transmit wireless power to the first electronic device and the second electronic device. For example, one repeater 130 may include the plurality of patterns 131b, some of which may be configured to deliver an electric field or a magnetic field to the first electronic device and the others of which may be configured to deliver the electric field or the magnetic field to the second electronic device.

More specifically, the plurality of repeaters 130 may be configured to transmit wireless power to the first electronic device and the second electronic device. For example, any one repeater 130 may be configured to transmit wireless power to the first electronic device, and another repeater 130 may be configured to transmit wireless power to the second electronic device.

Figure 19:
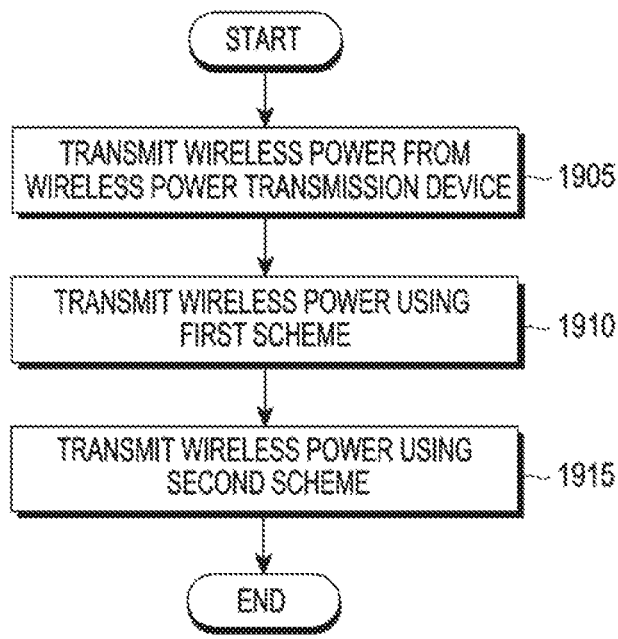
FIG. 19 is a flowchart illustrating a method for transmitting wireless power using a repeater, according to various embodiments of the present disclosure.

FIG. 19 is a flowchart illustrating a method for transmitting wireless power using a repeater, according to various embodiments of the present disclosure.

Shown in FIG. 19 is a flow of wireless power relay of the repeater 130 between the wireless power transmission device 100 and the electronic device 150 by using a plurality of transmission schemes.

In operation 1905, the repeater 130 may wirelessly receive power from the wireless power transmission device 100.

In operation 1910, the repeater 130 may wirelessly transmit power to the electronic device 150 by using a first scheme. More specifically, the repeater 130 may control a direction of an electric field or a magnetic field and radiate or concentrate the electric field or the magnetic field. The first scheme may be any one of radiation or concentration.

In operation 1915, the repeater 130 may wirelessly transmit power to the electronic device 150 by using a second scheme. The second scheme may be any one of radiation or concentration, and may be the same as or different from the first scheme.

For example, the repeater 130 may include the plurality of patterns 131b, some of which may be configured to deliver an electric field or a magnetic field by using the first scheme and the others of which may be configured to deliver an electric field or a magnetic field by using the second scheme.

Figure 20:
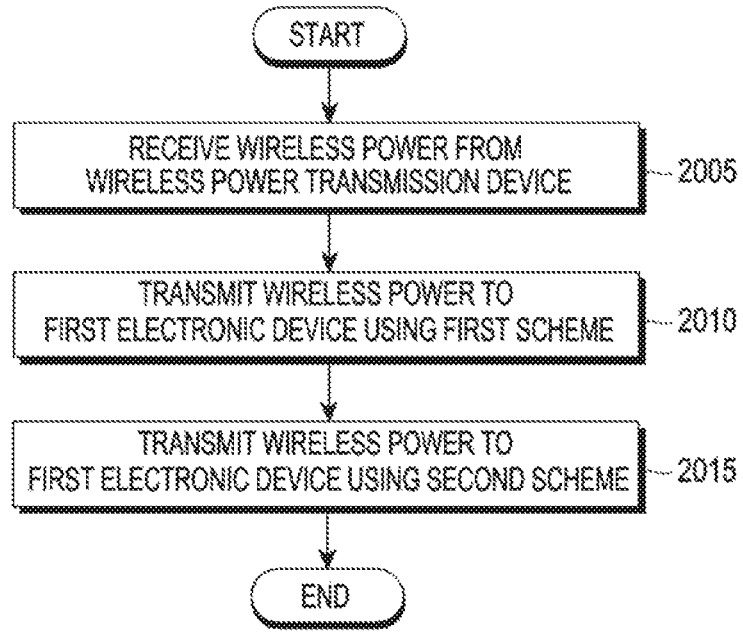
FIG. 20 is a flowchart illustrating a method for transmitting wireless power using a repeater, according to various embodiments of the present disclosure.

FIG. 20 is a flowchart illustrating a method for transmitting wireless power using a repeater, according to various embodiments of the present disclosure.

Shown in FIG. 20 is a flow of wireless power relay of the repeater 30 using a plurality of transmission schemes for the multiple electronic devices 150-1, 150-2, 150-3, . . . , 150-n.

In operation 2005, the repeater 130 may wirelessly receive power from the wireless power transmission device 100.

In operation 2010, the repeater 130 may wirelessly transmit power to the first electronic device by using the first scheme. More specifically, the repeater 130 may transmit wireless power to the first electronic device by using any one of radiation or concentration.

In operation 2015, the repeater 130 may wirelessly transmit power to the second electronic device by using the second scheme. More specifically, the repeater 130 may transmit wireless power to the second electronic device by using any one of radiation or concentration.

The first scheme and the second scheme may be the same as or different from each other, such that the first electronic device and the second electronic device may receive wireless power by using the same scheme or different schemes.

For example, the repeater 130 may include the plurality of patterns 131b, some of which may be configured to transmit wireless power to the first electronic device by radiating an electric field or a magnetic field and the others of which may be configured to transmit wireless power to the second electronic device by concentrating the electric field or the magnetic field. Some of the plurality of patterns 131b may also be configured to transmit wireless power to the first electronic device by concentrating the electric field or the magnetic field, and the others of the plurality of patterns 131b may be configured to transmit wireless power to the second electronic device by concentrating the electric field or the magnetic field.

In the repeater according to various embodiments of the present disclosure, the at least one pattern may include at least one first pattern that concentrates at least one of the electric field or the magnetic field in a first direction.

In the repeater according to various embodiments of the present disclosure, the at least one of the electric field or the magnetic field may be incident to the at least one pattern at a first incident angle, and the at least one pattern may include at least one second pattern that changes a traveling direction of the electric field or the magnetic field such that at least one of the electric field or the magnetic field is refracted at a negative refraction angle.

In the repeater according to various embodiments of the present disclosure, the at least one second pattern may have a negative permittivity or permeability.

In the repeater according to various embodiments of the present disclosure, the at least one of the electric field or the magnetic field may be incident to the at least one pattern at a first incident angle, and the at least one pattern may include at least one third pattern that changes a traveling direction of the electric field or the magnetic field such that at least one of the electric field or the magnetic field is refracted at a zero refraction angle.

In the repeater according to various embodiments of the present disclosure, the at least one third pattern may have a zero permittivity or permeability.

In the repeater according to various embodiments of the present disclosure, the first member may have a first region including at least one pattern radiating at least one of the electric field or the magnetic field and a second region including at least one pattern concentrating at least one of the electric field or the magnetic field in the first direction.

In the repeater according to various embodiments of the present disclosure, the first member may radiate at least one of the electric field or the magnetic field to a first electronic device through the first region, and concentrate at least one of the electric field or the magnetic field to a second electronic device located outside a vehicle in the first direction through the second region.

In the repeater according to various embodiments of the present disclosure, the first member may be a window of the vehicle, and the at least one pattern may be formed of a transparent material and may be attached to the first member.

In the repeater according to various embodiments of the present disclosure, the transparent material may include graphene.

In the window for the vehicle according to various embodiments of the present disclosure, the at least one pattern may include at least one first pattern that concentrates at least one of the electric field or the magnetic field in a first direction.

In the window for the vehicle according to various embodiments of the present disclosure, the at least one of the electric field or the magnetic field may be incident to the at least one pattern at a first incident angle, and the at least one pattern may include at least one second pattern that changes a traveling direction of the electric field or the magnetic field such that at least one of the electric field or the magnetic field is refracted at a negative refraction angle.

In the window for the vehicle according to various embodiments of the present disclosure, the at least one second pattern may have a negative permittivity or permeability.

In the window for the vehicle according to various embodiments of the present disclosure, the at least one of the electric field or the magnetic field may be incident to the at least one pattern at a first incident angle, and the at least one pattern may include at least one third pattern that changes a traveling direction of the electric field or the magnetic field such that at least one of the electric field or the magnetic field is refracted at a zero refraction angle.

In the window for the vehicle according to various embodiments of the present disclosure, the at least one third pattern may have a zero permittivity or permeability.

In the window for the vehicle according to various embodiments of the present disclosure, the second member may have a first region including at least one pattern radiating at least one of the electric field or the magnetic field and a second region including at least one pattern concentrating at least one of the electric field or the magnetic field in the first direction.

In the window for the vehicle according to various embodiments of the present disclosure, the second member may radiate at least one of the electric field or the magnetic field to a first electronic device through the first region, and concentrate at least one of the electric field or the magnetic field to a second electronic device located outside a vehicle in the first direction through the second region.

In the window for the vehicle according to various embodiments of the present disclosure, the at least one pattern may be formed of a transparent material.

As used herein, the term "module" may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer-readable recording medium includes hard disk, floppy disk, or magnetic media (e.g., a magnetic tape, optical media (e.g., compact disc read only memory (CD-ROM) or digital versatile disc (DVD)), magneto-optical media (e.g., floptical disk), a hardware device (e.g., ROM, RANI, flash memory, etc.), and so forth). Further, the program instructions may include a machine language code created by a compiler and a high-level language code executable by a computer using an interpreter. The foregoing hardware device may be configured to be operated as at least one software module to perform an operation of the present disclosure, or vice versa.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. A repeater for wireless power transmission, the repeater comprising:
   a first member; and
   at least one pattern formed on the first member and configured to provide at least one of an electric field or a magnetic field, which is incident to a first surface of the first member from a wireless power transmission device, through a second surface of the first member, which opposes the first surface, wherein at least one of the electric field or the magnetic field is incident to the at least one pattern at a first incident angle, and the at least one pattern comprises at least one first pattern that changes a traveling direction of the electric field or the magnetic field such that at least one of the electric field or the magnetic field is refracted at a negative refraction angle.

2. The repeater of claim 1, wherein the at least one pattern comprises at least one second pattern that concentrates at least one of the electric field or the magnetic field in a first direction.

3. The repeater of claim 2, wherein the first member comprises:
 a first region comprising at least one pattern radiating at least one of the electric field or the magnetic field; and
 a second region comprising at least one pattern concentrating at least one of the electric field or the magnetic field in the first direction.

4. The repeater of claim 3, wherein the first member radiates at least one of the electric field or the magnetic field to a first electronic device through the first region, and concentrates at least one of the electric field or the magnetic field to a second electronic device located outside a vehicle in the first direction through the second region.

5. The repeater of claim 1, wherein the at least one first pattern has a negative permittivity or permeability.

6. The repeater of claim 1, wherein the first member is a window of a vehicle, and the at least one pattern is formed of a transparent material and is attached to the first member.

7. The repeater of claim 6, wherein the transparent material comprises graphene.

8. A repeater for wireless power transmission, the repeater comprising:
 a first member; and
 at least one pattern formed on the first member and configured to provide at least one of an electric field or a magnetic field, which is incident to a first surface of the first member from a wireless power transmission device, through a second surface of the first member, which opposes the first surface,
 wherein at least one of the electric field or the magnetic field is incident to the at least one pattern at a first incident angle, and the at least one pattern comprises at least one first pattern that changes a traveling direction of the electric field or the magnetic field such that at least one of the electric field or the magnetic field is refracted at a zero refraction angle.

9. The repeater of claim 8, wherein the at least one pattern comprises at least one second pattern that concentrates at least one of the electric field or the magnetic field in a first direction.

10. The repeater of claim 9, wherein the first member comprises:
 a first region comprising at least one pattern radiating at least one of the electric field or the magnetic field; and
 a second region comprising at least one pattern concentrating at least one of the electric field or the magnetic field in the first direction.

11. The repeater of claim 10, wherein the first member radiates at least one of the electric field or the magnetic field to a first electronic device through the first region, and concentrates at least one of the electric field or the magnetic field to a second electronic device located outside a vehicle in the first direction through the second region.

12. The repeater of claim 8, wherein the at least one first pattern has a zero permittivity or permeability.

13. The repeater of claim 8, wherein the first member is a window of a vehicle, and the at least one pattern is formed of a transparent material and is attached to the first member.

14. The repeater of claim 13, wherein the transparent material comprises graphene.

* * * * *